United States Patent [19]

Fischer

[11] Patent Number: 4,707,842
[45] Date of Patent: Nov. 17, 1987

[54] APPARATUS AND METHOD FOR ACQUIRING DATA AND CLOCK PULSES FROM ASYNCHRONOUS DATA SIGNALS

[75] Inventor: Helmut Fischer, Munich, Fed. Rep. of Germany

[73] Assignee: Siemens Aktiengesellschaft, Berlin and Munich, Fed. Rep. of Germany

[21] Appl. No.: 844,353

[22] Filed: Mar. 26, 1986

[30] Foreign Application Priority Data

Apr. 3, 1985 [DE] Fed. Rep. of Germany ....... 3512224

[51] Int. Cl.$^4$ ............................................. H04L 7/02
[52] U.S. Cl. ..................................... 375/110; 328/72; 307/269
[58] Field of Search ............... 375/110, 111, 112, 113; 329/50; 328/63, 72; 307/269, 528; 371/42, 46

[56] References Cited

U.S. PATENT DOCUMENTS

| | | | |
|---|---|---|---|
| 4,004,275 | 1/1977 | Arndt et al. | 375/110 |
| 4,087,627 | 5/1978 | Sato et al. | 375/110 |
| 4,109,236 | 8/1978 | Besenfelder et al. | 371/21 |
| 4,317,111 | 2/1982 | Masoero | 375/110 |
| 4,344,039 | 8/1982 | Sugiura et al. | 329/50 |
| 4,357,707 | 11/1982 | Delury | 307/269 |
| 4,385,395 | 5/1983 | Tanaka et al. | 307/528 |
| 4,472,818 | 9/1984 | Zapisek et al. | 328/72 |
| 4,535,461 | 8/1985 | Stepp et al. | 328/72 |

Primary Examiner—Robert L. Griffin
Assistant Examiner—Stephen Chin
Attorney, Agent, or Firm—Hill, Van Santen, Steadman & Simpson

[57] ABSTRACT

A digital phase control circuit incorporates a phase detector and a controllable oscillator controlled by an internal clock. The oscillator is formed as a presettable counter which is counted by the internal clock and preset with a variable intial value corresponding to a function of the frequency of the current data clock derived from an incoming data stream. The phase detector is formed as a shift register for delaying data signals, a counter storage register associated with a counter, and an intermediate storage register associated with the shift register, the storage registers manifesting the state of the counter or the state of the shift register at a predetermined time during an operating cycle, as indicated by the counter. Depending on the position of a data signal in the shift register when the counter reaches a predetermined state, one of the storage registers is selected for connection to a rated value generator for selection of a new rated value for presetting the counter, such new rated value being selected in accordance with the frequency of the current data clock and with the phase-signifying content of one of the storage registers.

21 Claims, 12 Drawing Figures

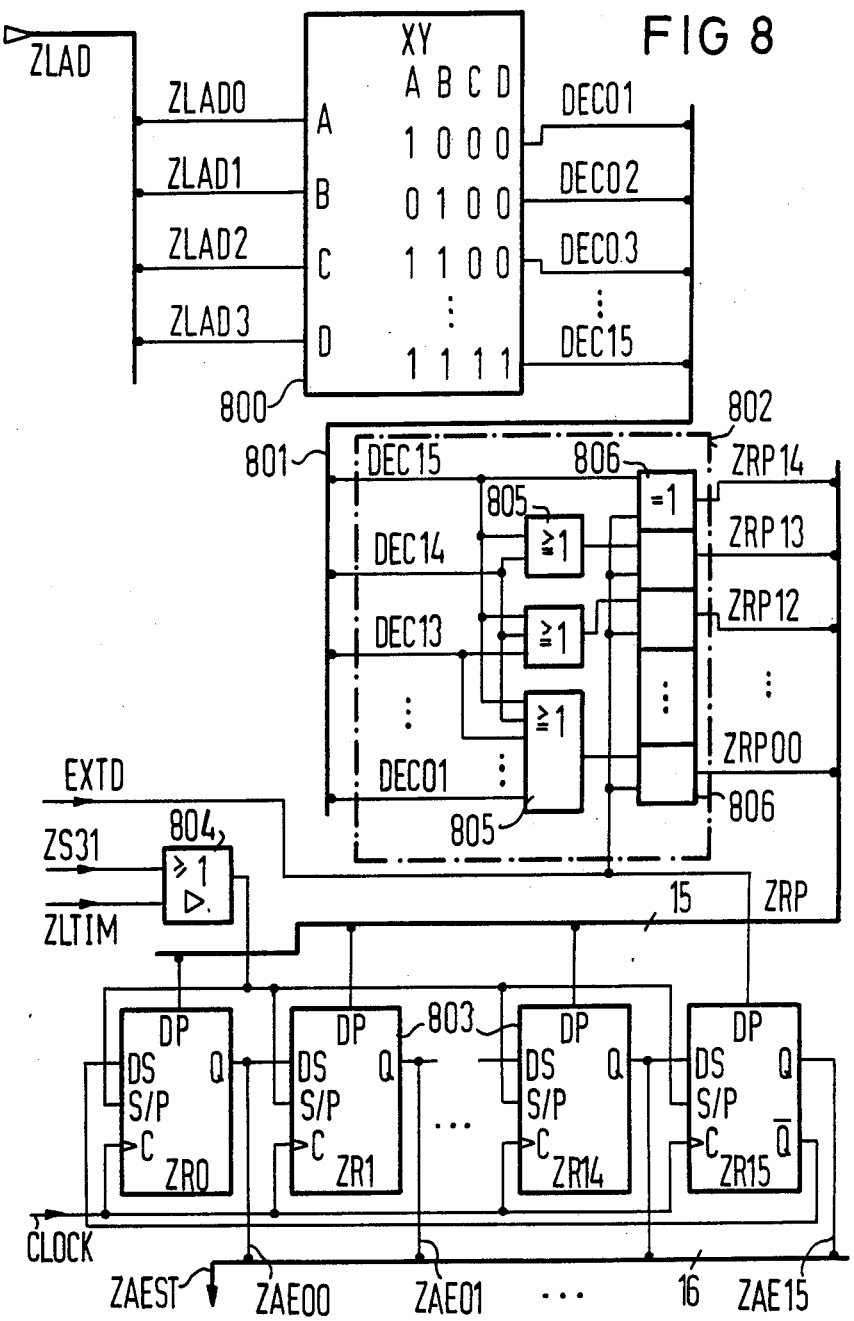

APPARATUS AND METHOD FOR ACQUIRING DATA AND CLOCK PULSES FROM ASYNCHRONOUS DATA SIGNALS

BACKGROUND

1. Field of the Invention

The present invention relates to a method and apparatus for acquiring binary data and clock signals from asynchronous input signals, such as from a magnetic tape storage device.

2. The Prior Art

Successful transmission from a data transmitter to a data receiver requires a sychronized clock signal. The clock signal may be disturbed by the fact that the incoming stream of data signals is incompletely received, as the result of variable transmission parameters, and disturbances either at the receiving location or along the transmission path. For example, when data is read from a magnetic tape storage device, the data is transmitted from the storage device without its own data clock, and it is therefore necessary, in order to retrieve the originally stored binary data, to generate a data clock from the data stream. This is done by a phase control circuit which must accomplish several different functions. In the case of frequency fluctuations in the data being received, such as changes in the sampling rate, the phase control circuit arrangement must be able to follow such frequency variations within a specific range and must therefore have the capability of locking into a variable frequency. Moreover, when one or more data pulses in the data stream is missing, the circuit arrangement must retain its previously determined frequency, i.e., exhibit holding behavior. Minor fluctuations in the timing of the data pulses, in the vicinity of their expected position, assuming a specific clock frequency, should not affect the determined clock frequency. In addition, the circuit arrangement must be able to resynchronize itself to the data stream as quickly as possible after an interruption in transmission.

Circuits which have been developed in the past for this purpose include analog as well as digital phase control circuits. Analog circuits require frequent readjustment and are therefore expensive, considering the time and expense required for down time and maintenence. Also, they are relatively unstable with the respect to their control function.

Digital phase control circuits or hybrid phase control circuits using mixtures of analog and digital circuits have been developed. These circuit arrangements typically include a phase detector and a controlled oscillator. Based on an internal clock generator, the oscillator is set to a nominal value, and the actual value of the momentary frequency and phase of the data clock of the received data signals is identified, by using a phase detector. When fluctuations are recognized, a new rated value is identified under given condition from a comparison of the detector conditions, and the oscillator is set to the new calculation frequency value. Such an arrangement is illustrated in U.S. Pat. No. 4,109,236. This arrangement operates in connection with a window, or a time period in which input pulses are expected, and the time position of such window is continuously adjusted in accordance with the frequency which is derived from the data already received. The received data signals are evaluation with an internal clock, and with the assistance of a main counter, the number of internal clock pulses between successive flux changes of the incoming data signals is averaged over a period of time. The mean value thus obtained furnishes an updated parameter for redefining the position of the window.

U.S. Pat. No. 4,357,707 shows a digital phase control circuit having a window with special characteristics. For example, the width of the window is variable, and its position and duration are both derived from the preceding two significant flux changes with respect to the windows in which they were detected.

In both of the phase control circuits referred to above, only digital components are used. Both the circuits proceed from the formulation of a mean value, based on evaluation of the length of preceding data signal periods, in order to eliminate brief duration fluctuations in the scanning or sampling rate, so as not to over compensate the phase control circuit for brief variations.

The fundamental task of a phase control circuit is to derive a manipulated variable by comparing incoming data to a rated value, in order to match a new rated value to the current actual value. From this point of view, the two phase control circuits referred to above both employ a new rated value determined by a hard-wired circuit which directly corresponds to a prior actual value averaged in a prescribed fashion. This calculation of mean value is determined only over an extended time period, which eliminates dependency of the function on brief duration fluctuations, but cannot respond well to greater phase modifications. A discontinuity in the phase which exceeds the capacity of the prior systems to track can lead to discontinous operation.

It is desirable not only to avoid the disadvantages of the analog or hybrid circuit arrangements but also fully to exploit the properties and possibilities of digital technology in generating the control function. In digital technology, appropriate means is available for the realization of the required complex functions, such as program controls or sequential combinational logical systems. However, when such means are employed, the complexity of the system increases, and the time required for executing the desired functions is also increased. It is therefore desirable to provide an arrangement which overcomes these difficulties.

BRIEF DESCRIPTION OF THE PRESENT INVENTION

It is a principal object of the present invention to provide a method and apparatus for forming a phase control loop formed exclusively of digital modules, in such a way that the current actual value, i.e., the current phase of the data signal, is identified as precisely as possible and is available sufficiently rapidly so that after a comparision of the actual and rated (or expected) value, adequate time is available in order to select a new rated value for the phase of the incoming data signals so that no incoming data is lost.

The possibility of easy adaptability to specific situations, which is inherant in digital circuit technology, is exploited to an optimal extent. The phase detector and the oscillator of the control circuit can be constructed in VLSI technology as a single integrated circuit. Then a further digital module is allocated to this complex integrated module to form a sequential combinational logic system, programmable logic network, or a read-only memory which supplies the phase control circuit with a new updated rated value. It is possible to employ a plurality of phase control circuits, one for each of a plurality of data tracks. In this way, a circuit can be designed so that a data track which is disturbed can be quickly brought back into correct phase relationship by using the current rated value from a neighboring track.

The present invention enjoys advantages which flow from the fact that the current information is available at a very early point in time within the processing cycle. This is achieved by dividing the current phase value into a leading and trailing phase component, employing shift registers and counters. The point in time at which a delayed marker pulse (signifying a data bit or part of a data bit cell) appears at the output of the shift register defines the actual position of a flux change associated with the marker pulse, with respect to the counter cycle. Even before the occurance of this event, however, the shift register provides a pointer which allows an exact prediction of when this event will occur.

The present invention achieves a completely new construction of a digital phase control circuit. When a read-only memory is used as a rated value generator, a great variety of boundary conditions can be incorporated in the control characteristic for the new rated values, such as the pull-in behavior or the holding behavior for the oscillator. These parameters can be very liberally defined to cover all possible combinations of rated values and actual values. It is also possible to incorporate filter functions, or means for shaping the shape of the data pulses, so as to compensate for a characteristic peak value shift in accordance with various data signal sequences.

The design of the present invention is relatively inexpensive in terms of development cost, and achieves a high quality result, and also allows adaptions or expansions to be carried out without requiring a modification of the structure of the digital phase control circuit. Relatively few integrated circuits are required for the digital phase control circuit, and it can readily be constructed in the form of a large scale integrated circuit.

BRIEF DESCRIPTION OF THE DRAWINGS

Reference will now be made to the accompanying drawings in which:

FIG. 8 is a schematic circuit diagram illustrating the counter of the phase control circuit;

DESCRIPTION OF PREFERRED EMBODIMENT

Figure 1:
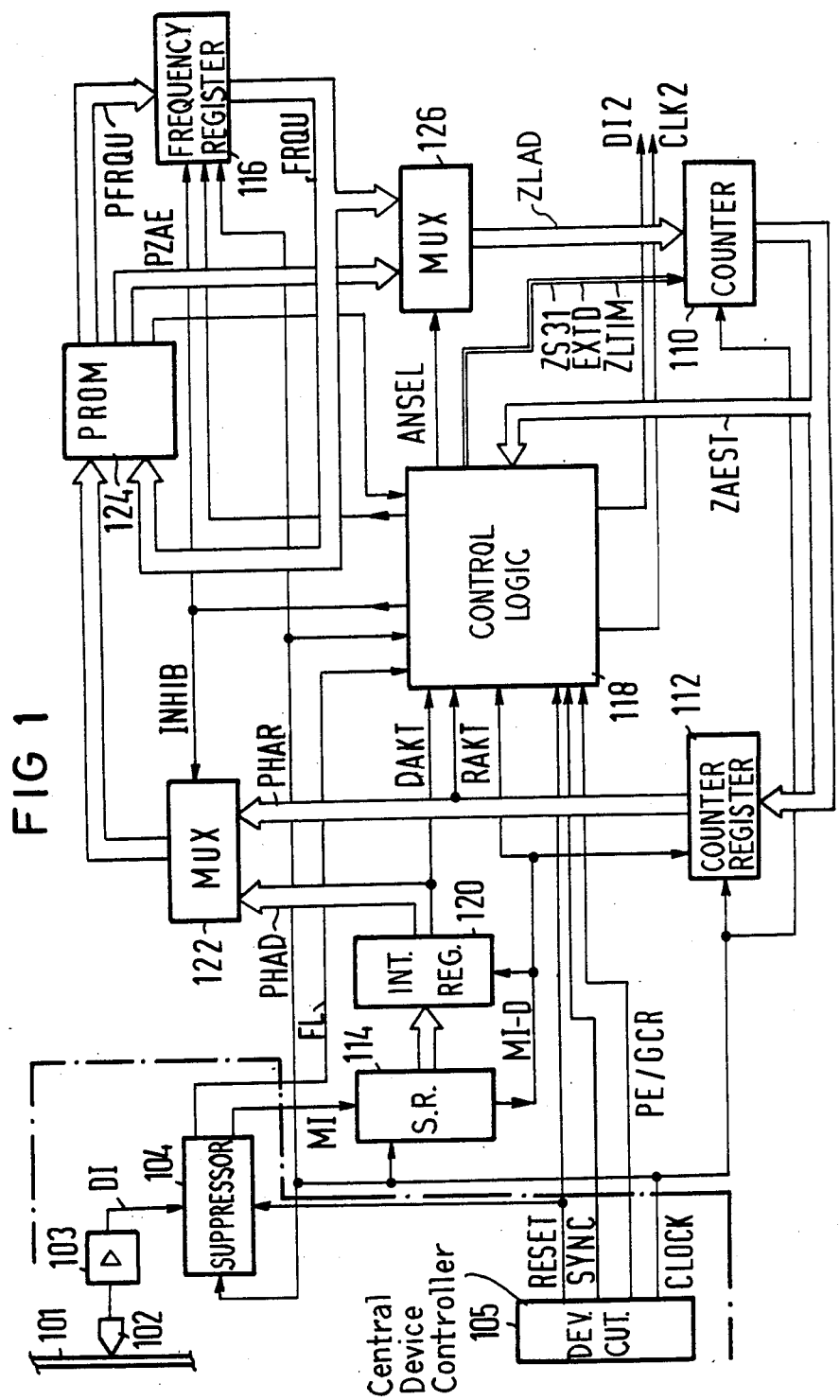
FIG. 1 is a functional block diagram illustrating a digital phase control circuit constructed in accordance with the present invention.

Referring now to FIG. 1, the essential components of the phase control circuit are shown, in connection with known components which perform for the read-write functions of a magnetic tape storage device or the like which is illustrated enclosed in the dot-dash line in FIG. 1. A magnetic tape 101 is transported past a read-write head 102, which is connected to an amplifier 103 to produce output data signals DI which are supplied to a suppressor circuit 104. The suppressor circuit 104 serves the purpose of deriving noise-free data signals, with sharp leading and trailing edges, and suppresses noise pulses. It produces marker pulses MI and edge signals FL which are supplied as input signals to the phase control circuit of the present invention, shown in FIG. 1 outside the area enclosed by the dot-dash line.

A marker pulse MI is a dynamic rectangular signal having a leading edge coinciding with the edge of noise-free data signal DI. The edge signal FL is a static signal having a value indicating the direction of the most recent edge change in the data signal DI between two successive marker pulses MI. Taken together, the two signals unequivocally describe rectangular signals corresponding to noise-free data signals.

A central device controller 105 is provided which is connected with the other components over a control bus. The control bus incorporates a plurality of lines for supplying various signals, of which four are illustrated in FIG. 1. The first of these lines carries a system clock CLOCK to the phase control circuit. A second carries a general reset signal RESET which places the phase control circuit and the suppressor circuit 104 in a defined initial condition. A third supplies a sychronization signal SYNC which initiates a synchronizing event in the phase control circuit for setting an initial value. Finally the fourth supplies a selection signal PE/GCR, which describes the mode of data storage on the tape 101. PE denotes the phase encoding method, and GCR denotes the group coded recording method.

The digital phase control circuit, shown to the right of the dot-dash line in FIG. 1, contains a counter 110 and register 112 which stores the counter value manifested by the counter 110 when a flux change is reached. The marker pulses MI are supplied to a shift register 114, and are shifted through the shift register under control of the system clock CLOCK. A frequency register 116 is provided for storing the current spacing between successive marker pulses MI, to identify the current value of the frequency of the data signals DI. The values stored in the register 116 are each in the form of a difference between the actual spacing and the maximum possible spacing. A control logic unit 118 is connected to the counter 110 and to the registers 112 and 116, as well as the other components of FIG. 1, to control their operation.

The marker pulses MI supplied to the phase control circuit each has a length corresponding to the period of the system clock CLOCK, and are shifted through the shift register 114 at the pulse repetition rate of the system clock. The shift register 114 preferably has a capacity or length of 16 bits or stages. The delayed marker pulse thus appears at the serial output of the shift register after 16 system clock cycles. It is supplied to the storage register 112 and triggers the register 112 into loading, and thereafter storing, the current value manifested by the counter 110. The counter 110 is preferably a 16 stage Johnson type counter having a maximum of 32 possible states. When the counter 110 reaches a predetermined state, such as the counter value "16" before the appearance of a delayed marker pulse MI-D, then the current state of the shift register 114 is retained and recorded in an intermediate storage register 120. The register 120 thereafter manifests the position of the marker pulse MI in the shift register 114, at the time the counter 110 reached the predetermined state.

Thus, the reading of the counter 110 is stored in the register 112, when the state of the counter is between 0 and 15 at the time the delayed marker pulse MI-D appears. If the delayed marker pulse did not arrive until after that period, however, the position of the marker pulse MI in the shift register 114 is stored in the register 120, corresponding to a counter value between 16 and 31. The counter reading at which a delayed marker pulse MI-D reaches the serial ouptut of the shift register 114 can be deduced from the position of the marker pulse MI stored in the register 120.

A multiplexer 122, which is sometimes hereinafter referred to as the phase multiplexer, receives two groups of inputs, one from the register 112 and one from the register 120, over buses PHAD and PHAR, respectively. These buses also include control lines DAKT and RAKT from the registers 120 and 112, respectively. The control lines DAKT and RAKT are also supplied to the logic unit 118.

The control logic unit 118 controls operation of the multiplexer 122 over a line INHIB and the multiplexer 122 supplies one of its input groups as outputs to a group of address inputs of a programmable read-only memory PROM 124. Additional address lines of the PROM 124 are connected over a bus FRQU to outputs of the frequency register 116. Thus, the total address supplied to the PROM is derived from information corresponding to the current frequency and the current phase of the incoming data signals. The data stored in the PROM 124 is defined in such a way that a new initial or rated value is selected from the memory location addressed by the address information. The new value is composed of a frequency component supplied to the frequency register 116 over a bus PFRQU, and a new loading value for the counter 110 which is supplied over a bus PZAE through a multiplexer 126.

The multiplexer 126 is sometimes hereinafter referred to as the counter multiplexer. It has two groups of inputs, one of which is connected to a plurality of outputs of the PROM 124 over a bus PZAE and another group of inputs connected to the bus FRQU. It is controlled by the control logic unit 118 over a control line ANSEL. The control line causes the multiplexer 126 to select one of the groups of inputs for connection as an output to the counter 110. The selection of one of the two groups of inputs depends on whether a flux change was detected within the preceding bit cell of the data signal DI. When this is not the case, then the current content of the frequency register 116 is maintained and a new value is entered into the counter 110. On the other hand, when a flux change is detected within the period of a bit cell, then information regarding the current phase relation is available after the counter 110 has reached its "16" state. It is therefore possible to obtain the new initial value for the counter 110 and the frequency register 116 before the end of the counter cycle has been reached, that is, before the counter 110 reaches the state "31".

The shift register 114 performs the function of a phase detector in cooperation with the intermediate storage register 120 and in cooperation with the phase multiplexer 122 and the storage register 112. The counter 110 performs the function of a controllable oscillator, driven by the control logic unit 118 over control lines ZS31, EXTD, and ZLTIM. Whenever it reaches its final value, it is loaded with a value supplied by the counter multiplexer 126. In the arrangement of FIG. 1, this loading value lies between 0 and 15, and is a current initial or rated value for the counter cycle of the counter, in synchronism with the momentary or current frequency or phase of the incoming data signals DI. The counter reading manifested at any time by the counter 110 also defines the timing of the control sequence for the control logic unit 118, and for this purpose the state of the counter 110 is continuously supplied to the control logic unit 118 over the counter output bus ZAEST.

In the general scheme of operation of the phase detector, the frequency register 116 stores the momentary or current frequency of the incoming data stream, derived from the spacing in time of the marker pulses MI-D, by counting the periods of the system clock CLOCK which occur between successive marker pulses. For example, when the frequency of the system clock CLOCK is selected such that the chronological spacing between two successive marker pulse MI-D corresponds to 24 periods of the system clock (in accordance with the current speed of the magnetic tape 101), then the counter cycle of the counter 110 must have a radix sufficient to accomodate this tape speed. In the selected example, the counter 110 has 32 counter states ZS00 through ZS31. In order to set the counter cycle corresponding the momentary frequency of the incoming data stream, then the counter must be set to initial value of 8, which is the loading value at the example speed of the magnetic tape. This value is stored in the frequency register 116 as the current frequency value. This relation can be expressed by the equation:

$$FREQ = n*(ZAEmax + 1 - AB) + RU$$

in which ZAEmax is the radix of the counter, AB is the spacing between two successive marker pulses, n is a multiplier which is preferably a power of 2, and RU is a rounding value.

In the above example, the maximum value of the counter 110 is 31, and the bit spacing at the nominal speed of the magnetic tape is AB=24. When the multiplier is four, then the frequency register 116 contains the value "32" at the nominal speed of the magnetic tape. Because the multiplier equals 4, the frequency register 116 yields a loading value for the counter 110 of 32/4=8.0, which is the loading value referred to above.

The counter 110 can be loaded with values between 0 and 15. With the multiplier equals 4, the frequency register 116 must be adjustable to values between 0 and 63, i.e., a 6 stage binary register is required.

The value stored in the frequency register 116 serves two purposes. When a flux change has not been detected within the current bit cell, then the current stored value is taken from the frequency register 116 at the end of the cycle of the counter 110, and the counter 110 is set to its initial value for the next cycle. In the above example, with a loading value of 8, the next bit cell has a length of "24". On the other hand, when a flux change is detected within the running bit cell, then the content of the frequency register 116 is employed as a measure for the rated position and a correction is undertaken if required.

The rated position of the flux change with respect to a defined bit cell depends on the selection of the magnetic recording method. For example, in the PE or phase encoding method, a flux change is always present in the middle of the bit cell and an additional flux change may be present at the end of the bit cell. In the GCR (or group coded recording method), by contrast, a flux change occurs only in the middle of the bit cell but flux changes do not occur in all bit cells. As an example for explanation, it may be assumed that the flux change should coincide with the middle of the bit cell. When the loading value for the counter 110 is LW, then the rated position for a flux change FW may be derived from the following relationship:

$$FWrated = LW + \frac{ZAEmax - LW}{2}$$

$$= n* \frac{(ZAEmax + LW)}{2n}$$

in which n*LW corresponds to the frequency register content FREG. Thus, for the above example:

$$FWrated = \frac{124 + FREG}{8}$$

The rated position of the flux change at the current speed of the magnetic tape can thus be calculated with the above relationship for the assumed example and produces a value of 19.5. This assumes that the flux has already occurred earlier, such as at the phase relation "17". Only whole numbered phase relationships are possible, due to the discrete binary function of the counter 110. Then the phase error amounts to −2.5, and this deviation from the rated position must now be corrected.

The content of the storage register 112 is supplied via the phase multiplexer 122 to a plurality of address inputs of the PROM 124, and the content of the frequency register 116 is supplied to the other address inputs of the PROM at the end of the cycle of the counter 110. A storage cell within the PROM 124 is thus addressed in which is stored a calculated correction value for the frequency register 116 and a loading value for the counter 112, and these values are selected by the address identified by the unique combination of address inputs supplied to the PROM 124.

The phase control circuit is interpreted as a PI regulator for the calculation of the correction values. Based on the known principles applied to this type of regulator, a multitude of programming possibilities for the PROM 124 can be designated, under given conditions, which are specifically matched to defined use cases. An example will be used to indicate one of the possibilities. In the example, the calculation of the new loading value as the initial value ANF can be based on the relationship:

$$ANF = (FWactual - FWrated)*p + LW$$

in which FWactual is the actual value of the phase of the current flux change, FWrated is the corresponding rated value, p is the amplification factor in a range between 1/12 and 1, and LW is the current loading value of the counter.

The range in values for the p amplification value results from the fact that the regulator would become unstable if the amplification exceeded the upper limit, and would be inadequate below the lower limit.

The following relationship is valid for a corrected frequency value which is loaded into the frequency register 116:

$$FREG = (FWactual - FWrated)*i + FREGcurr$$

in which i is the amplification factor and FREGcurr is the current content of the frequency register.

From the known principles applied to PI regulators, a multitude of control functions, which can be made arbitrarily complex, can be realized for the digital phase control circuit. This is possible because the actuating variables for the control circuit are stored in a programmable read-only memory as empirical or individually calculated values. For example, it is possible to employ small amplification factors to accommodate great deviation from a rated position in order to stabilize the control circuit. On the other hand, minimum actuating variables can be introduced for small deviations, and they can also be introduced for the employment of small amplification factors.

When the digital phase control circuit of the present invention is employed for the retrieving of the clock signals of data transmitted from magnetic storage devices, it is possible to accomodate more extensive disturbing influences in the data signals than can be accomodated with other devices. This is particularly true for the peak shift of the signal read from the storage device. When a phase control unit according to this invention is provided individually for a plurality of parallel data tracks, it is also possible to take the actuating variables for the plurality of tracks individually from a common read-only memory, using a read-only memory which has a sufficiently fast access time.

It is also possible to read defective tracks from a magnetic storage device, since the content of the frequency register 116 for a properly operating parallel track may be used to read the defective track. It is also possible to substitute other arrangements for the programmable read-only memory described above. For example, a sequential logic system based on a programmable logic network could be used for generating the actuating variables in place of the PROM. Also, a ROM can be substituted for the PROM.

In the above example with the phase error of −2.5, from the relationships described above, a new initial value ANF=7 and a new frequency value FREG=30 can be calculated, assuming a p amplification factor p=0.4 or and i amplification factor i=0.8. Using the relationship set forth above, a new rated value for the phase relation can be calculated as FWrated=19.25.

The details of an operating cycle of the unit shown in FIG. 1 will now be described. The control logic unit 118 is essential to operation of the other units. Due to its complexity, it is shown in block diagram from in FIG.

2, to illustrate the circuit connections for data and control signals.

Figure 2:
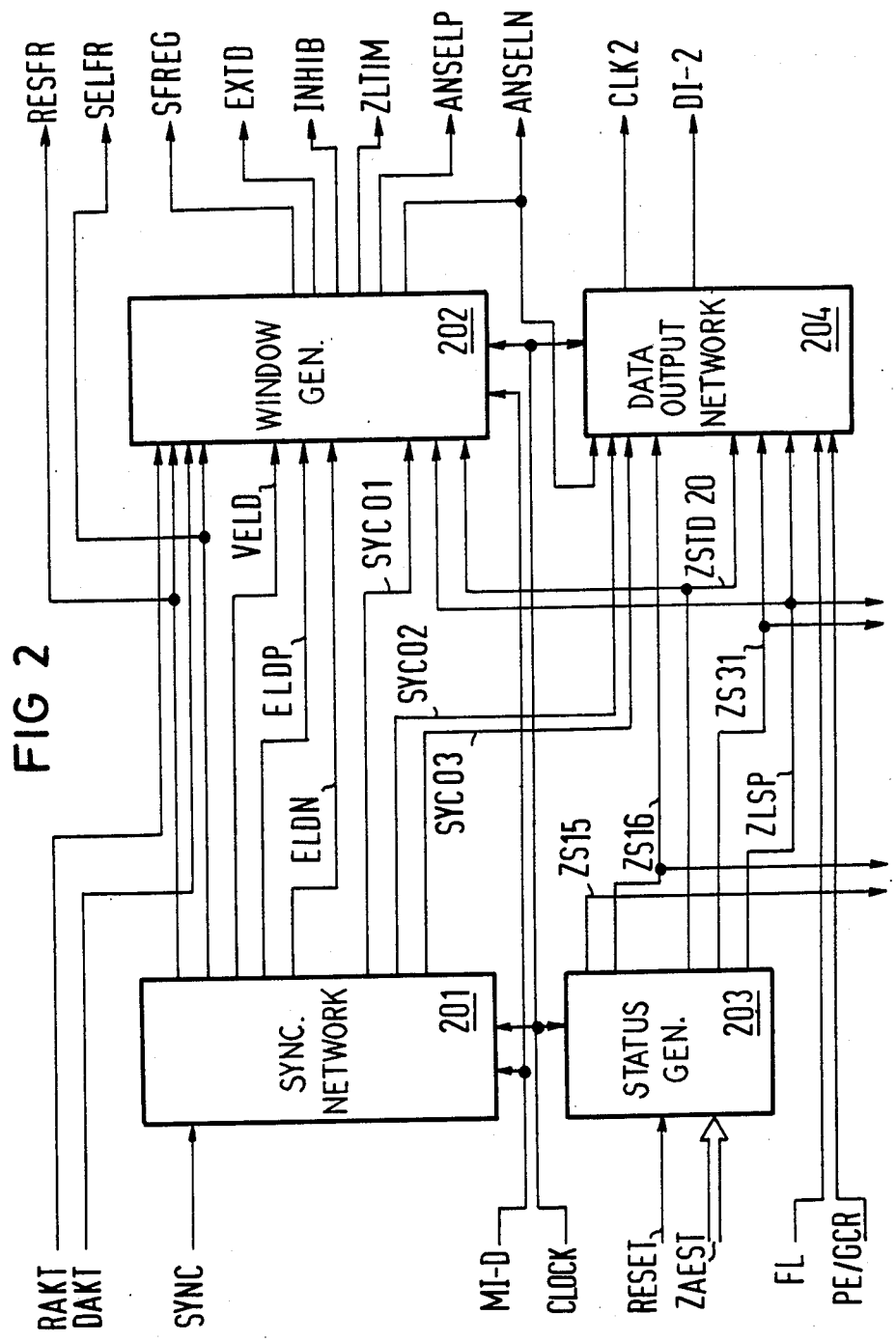
FIG. 2 is a functional block diagram of the control logic unit portion of the phase control circuit.

FIG. 2 shows four functional units of the control logic unit 118, namely, a synchronizing network 201, window generator 202, a status generator 203 and a data output network 204. The data and control signals which are supplied externally to the control logic unit 118 have already been functionally described in connection with FIG. 1.

Figure 3:
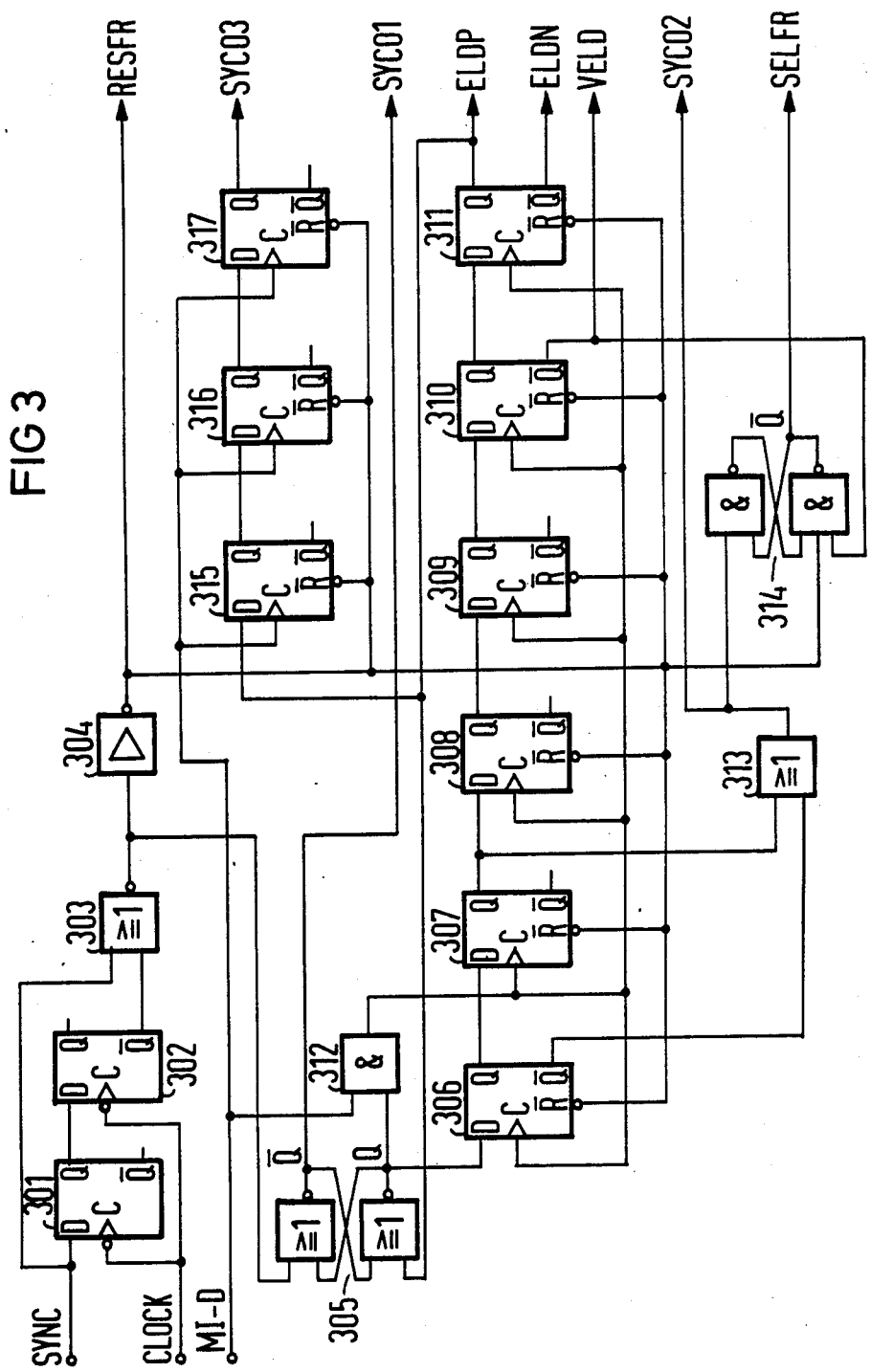
FIG. 3 is a schematic diagram of a sychronizing network of the digital control logic unit.

FIG. 3 shows the details of the sychronizing network 201. This circuit is operative at the begining of a new read operation. In the case of a magnetic storage device, particularly a magnetic tape storage devices, the formating of the stored data in the form of data blocks is generally standard and the data is read out in the form of blocks. Each data block contains a preamble in which groups of defined pulses are recorded for the purpose of electronic sychronization. The formating enables a fast phasing the of the phase control circuit under the control of the synchronizing network 201 shown in FIG. 3.

The synchronizing operation is initiated by a sychronization signal SYNC, which is one of the control signals supplied by the central control 105 (FIG. 1). In general, the current frequency of the data stream is derived from a continuous sequence of data signals contained within the preamble of a data block, and the frequency register 116 is loaded with the current frequency in the manner which has been described above in connection with FIG. 1. The frequency register 116 (FIG. 5) is a resettable binary counter which can be operated in its counting mode during the synchronizing operating, to determine the timespan in which a predetermined sequence of data signals of the preamble occurs. This results in the generation of a value corresponding to the loading of the counter 110, which is valid at the current tape speed. It is obtained in the frequency register 116 at the end of the synchronizing operation. The counting mode of the frequency register 116 is activated at a precise point in time, as controlled by the system clock CLOCK. The counting mode is deactivated after a number of synchronization cycles and at that time the current frequency of the data stream is contained in the frequency register. The content of the frequency register at the end of the synchronization operation is defined by:

$$FREGsyn = k*(FREGmax + 1) - m*AB$$
$$= n*(ZAEmax + 1 - AB)$$

in which FREGsyn is the content of the frequency register at the end of the synchronization operation, k is a multiplier which allows for the possible overflow of the frequency register in its counter mode, and m is a predetermined number of synchronization cycles (or the number of data pulses). The other quantities are as defined above.

It follows from the fact that the counter 110 can be loaded with values between "0" and "15", and the fact that the loading value forms the content of the frequency register that:

$$i*(ZAEmax+1)=FREGmax+1$$

where i is a multiplier factor. This relation can be transformed into:

$$k*i(ZAE+1)-m*AB=n*(ZAEmax+1)-n*AB$$

This relationship is met when $m=n=k*i$. In the example discussed above, it has been assumed that $n=4$. In the counter mode, the frequency register first contains the current frequency value corresponding to the loading value after four successive data signals (or marker pulses MI), whereby register overflow occurs once during the four signals. From the determination of the maximum loading value for the counter 110, and with the multiplier $n=4$, then preferably $i=2$ and $k=2$.

As shown in FIG. 3, this situation is realized. The synchronization control signal SYNC is first evaluated with the system clock using two D-type flip-flops 301 and 302, which are connected in series with respect to their data inputs and outputs. The data input of the first D-type flip-flop 301 and the $\bar{Q}$ output of the flip-flop 302 are logically combined in a NOR gate 303. When the synchronization control signal SYNC is a low level signal, the NOR gate 303 produces a high level output for the length of one period of the system clock. This signal is passed through an inverter 304 to produce a reset signal RESFR which has a length of one system clock cycle. The output of the NOR gate 303 is also supplied to the set input of an RS-flip-flop 305 in order to activate the sychronization network by producing a high level at the Q output of the flip-flop 305. The inverse of this signal, from the $\bar{Q}$ output of the flip-flop 305, is supplied as a control signal SYC01 to the window generator 202 (FIG. 2).

A chain of D-type flip-flops 306–311 is constructed as a shift register, with the Q output of each being connected to the data input of the succeeding flip-flop. The reset inputs of all of the flip-flops 306–311 are connected in common to the output of the inverter 304. The shift clock for the flip-flops 306–311 is derived from the marker pulses MI-D, which are produced at the serial output of the shift register 114 (FIG. 1). An AND gate 312 has one input connected to receive the MI-D pulses and the other connection to the Q output of the flip-flop 305, which is also connected to the data input of the shift register (306–311), namely, the data input of flip-flop 306. Thus, a logical "1" is supplied to the first flip-flop, and is shifted through the chain of flip-flops 306–311 after the flip-flop 305 becomes set, at the rate of one stage for each marker pulse MI-D.

The flip-flop 306 changes its output state with the first marker pulse which occurs after resetting the flip-flops 306–311. An OR gate 313 has its inputs connected to the $\bar{Q}$ output of the flip-flip 306, and the Q output of the flip-flop 307. It produces an output in coincidence with the arrival of the second delayed marker pulse MI-D and supplies its output SYC02 to the data output network 204 (FIG. 2). The trailing edge of the pulse SYC02 identifies the start of the counter mode of the frequency register 116.

The signal SYC02 is connected to the set input of a further RS-flip-flop 314 causing its $\bar{Q}$ output to go low to generate a low signal SELFR, which is used as a selection signal for the frequency register 116. It activates the counting mode of the register 116 when SELFR is low, and the normal register mode when SELFR is high.

The flip-flop 310 is set after the fifth delayed marker pulse MI-D appears, during the synchronization. This occurs four bit cells after the begining of the counter mode and identifies its end. A corresponding control signal VELD is taken from the $\bar{Q}$ output of the flip-flop 310 to identify this point in time. After one further bit cell, the last flip-flop 311 of this chain is also set and generates a high level signal ELDP and a low level signal ELDN, which identify the end of the synchronization operation. These signals are supplied to the window generator 202 (FIG. 2).

At the end of the synchronization operation, the phase control circuit is synchronized, as set forth in detail hereinafter, in connection with the frequency register 116. The RS-flip-flop 305 is reset at this time by the high level on the signal ELDP. The flip-flop 314 is reset one bit cell earlier by the control signal VELD which is connected to its reset input.

A chain of flip-flops 315–317 is connected as a shift register, with the D input of the first flip-flop 315 connected to receive the reset signal ELDP, and the reset inputs of the flip-flops 315–317 being connected to receive the reset signal RESFR. When the signal ELDP goes high, the reset high on the flip-flops 315–317 is released, and the high level applied to the D input of the first flip-flop 315 is clocked through the flip-flops 315–317 by the MI-D pulses applied to the clock inputs of these flip-flops. This results in production of a third synchronization signal SYC03 at the Q output of the flip-flop 317. This signal is supplied to the data output network 204 (FIG. 2).

Figure 4:
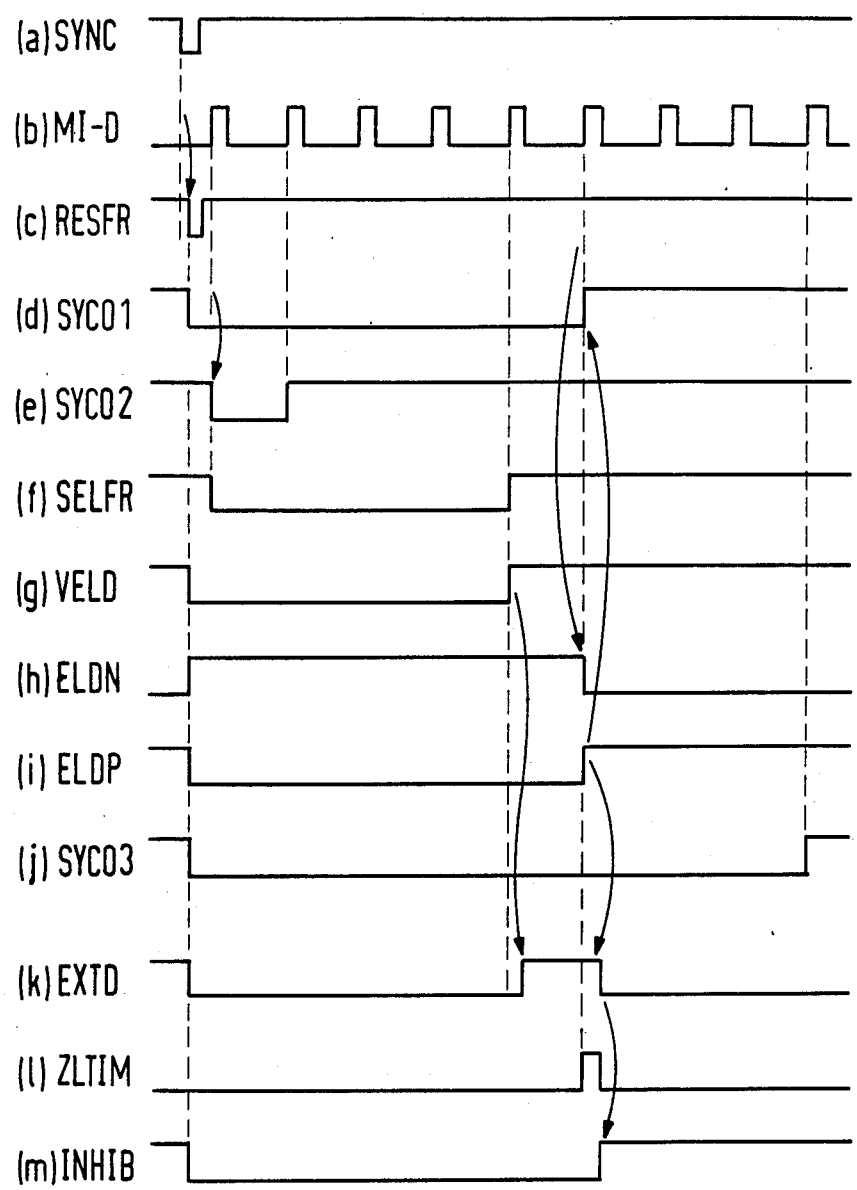
FIG. 4 is a series of timing diagrams showing the time relationship of input signals and output signals of the synchronizing network.

The above signals are illustrated in chronological sequence in FIG. 4. FIG. 4(a) shows the SYNC signal, and the delayed marker pulses MI-D are shown in FIG. 4(b). The reset signal RESFR (FIG. 4(c)) is generated immediately after the SYNC signal, and the first, second and third derived synchronization signals SYC01, SYC02 and SYC03 are shown in FIG. 4(d), (e) and (j). The selection signal SELFR is shown in FIG. 4(f) and the control signals VELD, ELDN and ELDP are shown in FIG. 4(g), (h) and (i). The curved arrows in FIG. 4 indicate the cause and effect relationships of the timings of the various signals, which has been described above.

Figure 5:
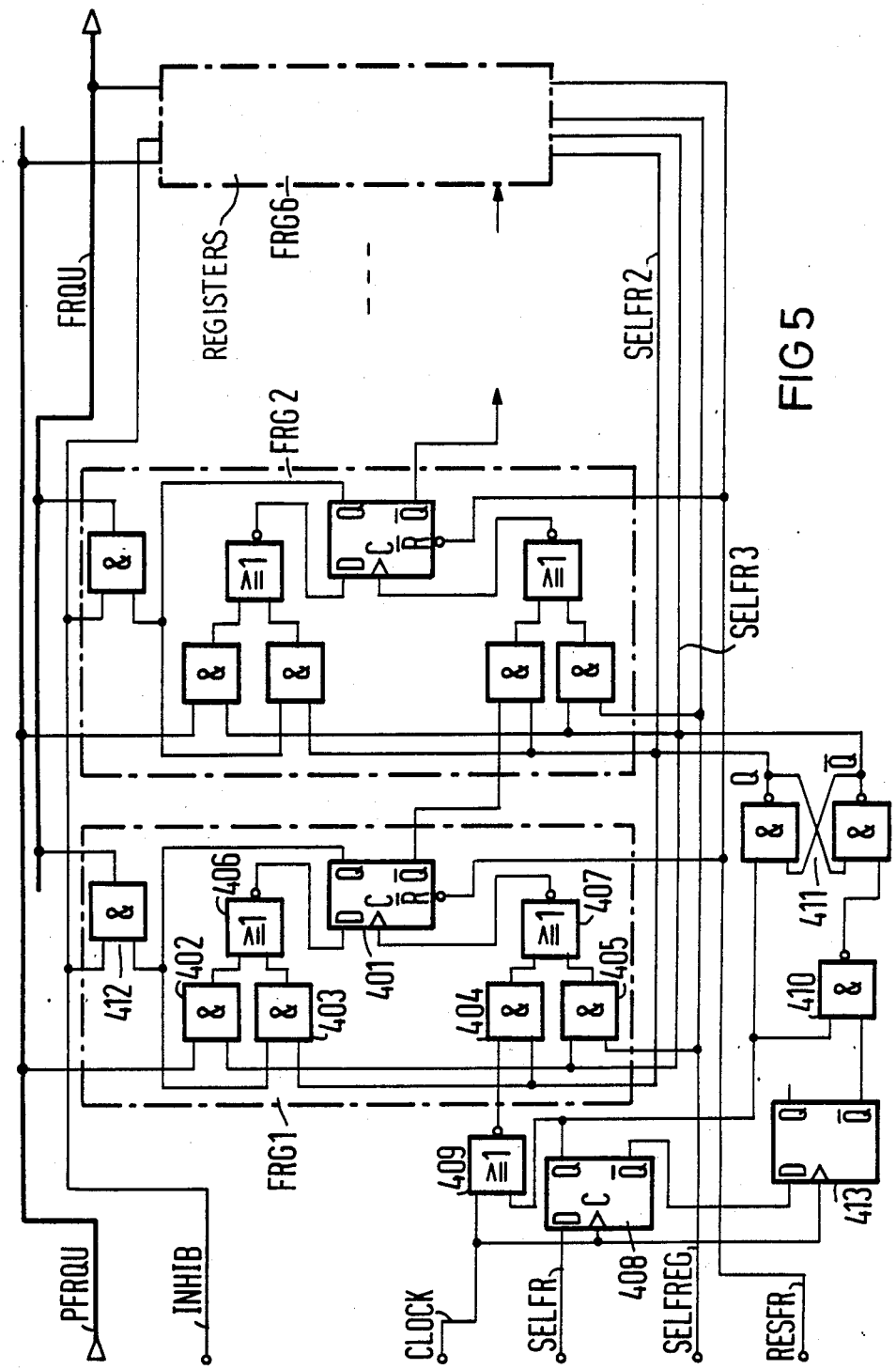
FIG. 5 is a schematic circuit diagram of a frequency register for the phase control circuit for manifesting the current rated value of the frequency of the incoming data pulses.

FIG. 5 illustrates the details of the frequency register 116. It is composed of six identical register stages FRG1–FRG6, which are designed such that the register forms a six stage presettable, downwardly counting binary counter. Each register stage contains a D-type flip-flop 401. In order to select the two operating modes (the memory mode and the counter mode), the data inputs and clock inputs are each connected to a logic network comprising two AND gates and a NOR gate. One of the two AND gates in each network is selected in accordance with the desired mode of operation. The network connected with the D input of the flip-flop 401 has AND gates 402 and 403, each with their outputs connected through a NOR gate 406 to the D input of the flip-flop 401. The AND gate 402 is connected to a line of the loading bus PFRQU and is active in the memory mode. The AND gate 403 has an input connected to the Q output of the flip-flop 401, and is active in the counting mode. The network connected to each clock input of the flip-flops 401 incorporates AND gates 404 and 405 which have their outputs connected through a NOR gate 407 to the clock input of the flip-flop 401. The AND gate 405 is connected to receive a signal from the SELFREG bus, described hereinafter, and is active in the memory mode. The AND gate 404 is connected to the system clock through a NOR gate 409 (in the first stage) or to the $\overline{Q}$ output of the next less significant register stage, and is active in the counting mode.

Two selection signals SELFR2 for the counter mode, and SELFR3 for the memory mode, are derived from the selection signal SELFR which is produced by the synchronization network 201 (FIG. 3). This signal is supplied to the D input of a flip-flop 408 which has its clock input connected to the system clock. The Q output of this flip-flop is connected to one input of the NOR gate 409 to allow the NOR gate 409 to supply inverted clock pulses through the logic network to the clock input of the flip-flop 401 of the first register stage FRG1, as long as the Q output of the flip-flop 408 is low.

The Q output of the flip-flop 408 is also connected to one input of a NAND data 410, and to an input of an RS-flip-flop 411. The $\overline{Q}$ output of the flip-flop 408 is connected to the second input of the NAND gate 410 through a further D-type flip-flop 413 which has its clock input connected to the system clock. It serves to invert and delay the signal by one system clock cycle. The output of the NAND gate 410 is connected to the other input fo the RS-flip-flop 411.

The reset signal RESFR is generated at the begining of the synchronizing operation. It resets all the D-type flip-flops 401 of the register stages FRG1–FRG6. As soon as the negative-going edge of the selection signal SELFR appears, at the begining of the counter mode, the flip-flop 408 switches its state and produces a low level signal at its Q output with the appearance of the next system clock pulse. This sets the RS-flip-flop 411, causing the control line SELFR2 to go high, activating all the AND gates 404 and 403 in the several register stages.

At the nominal speed of the magnetic tape, the next delayed marker pulse MI-D coincides with the counter reading 64−24=39 and the marker pulse after the next coincides with the counter reading 15. Between this and the third delayed marker pulse MI-D, the counter reading passes through "0" and reaches the value "56" at the third marker pulse MI-D. Finally a counting value of "32" is reached by the frequency register 116 at the fourth delayed marker pulse MI-D. At this point in time, the synchronizing network 201 emits the control signal VELD for the end of the counter mode. This causes a switching of the control line SELFR, so that the flip-flop 408 switches at the next system clock pulse and resets the RS-flip-flop 411, bringing the SELFR3 line high, and selecting the memory mode of operation for the frequency register 116. In this operating mode, the AND gates 402 and 405 are active for the register stages FRG1–FRG6, so that a new frequency value, transmitted over the loading bus PFRQU, can be loaded into the register under control of the loading control signal SELFREG via the AND gates 405.

Each of the register stages FRG1–FRG6 also has a further AND gate 412 having one input connected to the Q output of its respective stage, and the other input connected to a control line carrying the signal INHIB which is explained herein after. The several AND gates 412 are connected in parallel to individual lines of the bus PRRQU which is connected to the PROM 124 and the multiplexer 126 as shown in FIG. 1. The frequency register 116 is thereby connected to FRQU when the INHIB signal goes high.

Figure 6:
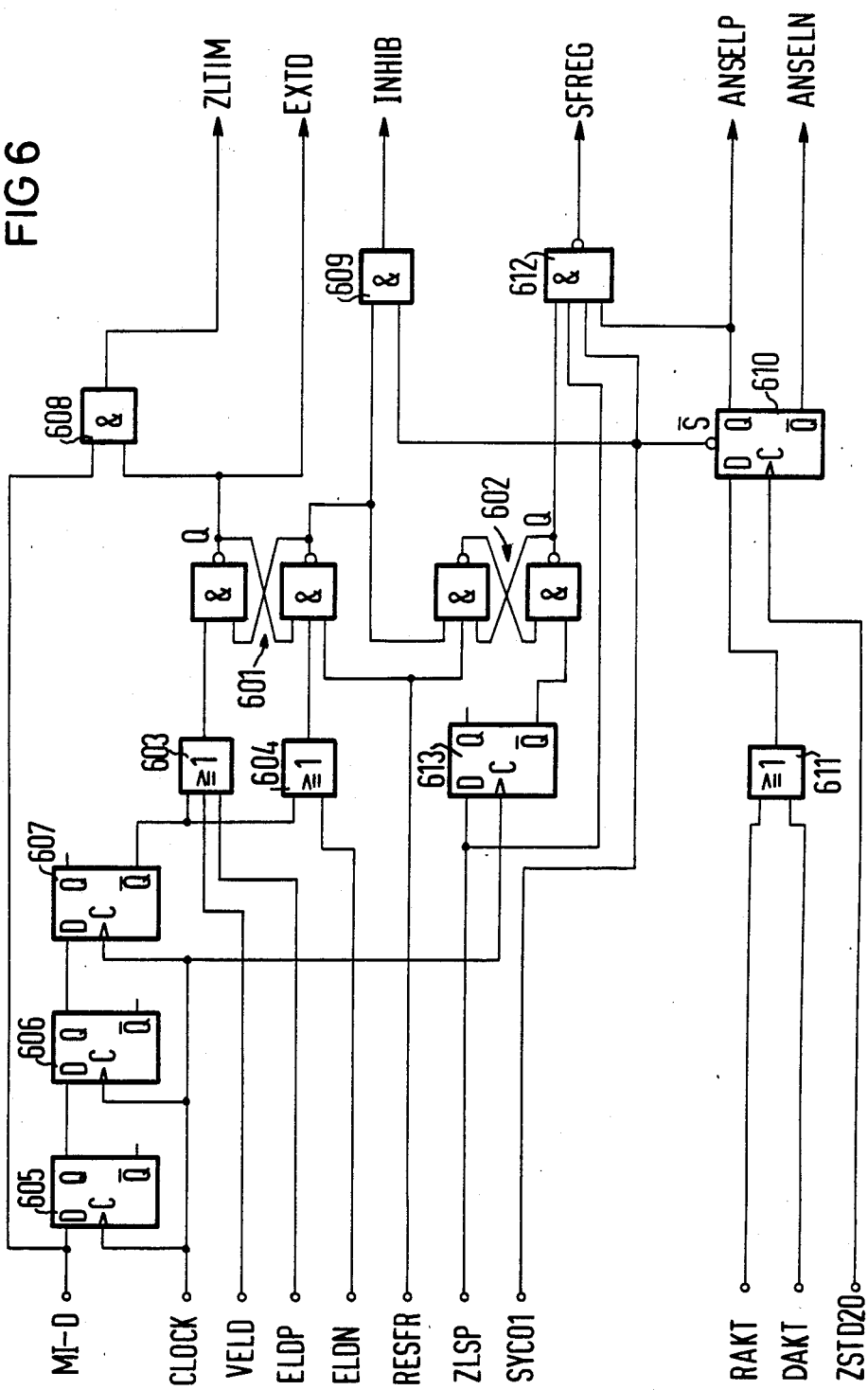
FIG. 6 is a circuit diagram of the window generator of the control logic unit.

Referring now to FIG. 6, a circuit diagram for the window generator 202 is illustrated. The function of the window generator is to produce time and control signals for initiating defined executions of the phase control circuit in sychronization with the counter cycle.

The window generator incorporates two RS-flip-flops 601 and 602, which are both reset at the begining of the sychronizing operating described above with the reset signal RESFR. In the reset state the Q output of each of the flip-flops 601 and 602 has a low level. An OR gate 603 is connected to the set input of the flip-flop 601, and an OR gate 604 is connected to a third input of the NAND gate forming the lower half of the flip-flop 601.

A chain of three D-type flip-flops 605–607 is provided for shifting the delayed marker pulses MI-D in the fashion of a shift register, under control of the system clock pulses. The $\overline{Q}$ output of the flip-flop 607, which is the last of these three is connected as an input to each of the OR gates 603 and 604. Other inputs of the OR gates 603 are also connected to receive the control signals VELD and ELDP from the synchronization network 201 (FIG. 3). The inverted control signal ELDN is supplied as a second input to the OR gate 604. The flip-flop 601 remains reset until, at the end of the counter mode, the control signal VELD goes high and subsequently the $\overline{Q}$ output of the flip-flop 607 assumes a low value. The set condition of the flip-flop 601 is maintained for one bit cell, since the control signals ELDP and ELDN change their state the end at that time, thereby setting the flip-flop 601.

The time control signal EXTD (shown in FIG. 4(k)) is produced while the flip-flop 601 in its set condition, on a line connected to the Q output of the flip-flop 601. It is supplied to the counter 110 for control purposes. This signal has a high level between the end of the counter mode, as described above, and the evaluation of the next delayed marker pulses MI-D.

An AND gate 608 has one input connected to the Q output of the flip-flop 601 and its other input connected to receive the MI-D pulses, to produce a pulse on the line ZLTIM during this time window, coincident with an MI-D pulse. The EXTD pulse is a window pulse and is shown in FIG. 4(k).

An AND gate 609 has one input connected to the Q output of the flip-flop 601, and its other input connected to receive the SYC01 signal, to produce the INHIB signal used in FIG. 5, begining at the trailing edge of the ZLTIM signal, as shown in FIG. 4(l) and 4(m). From the timing illustrated in FIG. 4(m), it is clear that the register outputs of the frequency register 116 are inhibited during the synchronization operation. The INHIB line also causes an inhibition of the multiplexer 122, so that an address of "0" is connected to the address inputs of the PROM 124.

The window generator, FIG. 6, also generates two mutually inverse selection signals ANSELP and ANSELN for control of the counter multiplexer 126 from the outputs of a further D-type flip-flop 610. When the first of these signals is high, the counter multiplexer 126 connects the bus PZAE from the outputs of the PROM 126 as the new loading value of the counter 110. In the other signal status, the content of the frequency counter 116 is connected over bus FRQU through the multiplexer to load the counter 110.

The D input of the flip-flop 610 is connected to the output of an OR gate 611, the inputs of which are connected to receive the signal DAKT from the intermediate storage register 120, and the signal RAKT from the register 112. Thus, the D input of the flip-flop 610 is always at its logical "1" condition when one of the two registers 112 and 120 is occupied, that is, when a flux change is identified during the running bit cell. The clock input for the flip-flop 610 is connected to receive a signal ZSTD20 which is an output of the status generator 203 described herein after. This signal specifies the status or counter state "20" of the counter 110. The flip-flop 610 is held in its set condition by a low signal SYC01 during the entire synchronization operation.

The final output of the window generator 202 is the signal SFREG, produced as an output of a NAND gate 612. Two of its inputs are connected to the Q outputs of the flip-flop 602 and 610. A third input is connected to the sychronization signal SYC01 and the fourth is connected to the signal ZLSP which is generated by the status generator 203, and which identifies the counter condition "loading" in order to control loading operations of the frequency register 116 and the counter 110. The SFREG signal is low when all of the inputs of the NAND gate 612 are high.

The ZLSP signal is also supplied to the D input of a flip-flop 613, which has its clock input connected to the system clock. Its $\overline{Q}$ output is connected to the set input of the RS-flip-flop 602. In a synchronized condition of the phase control circuit all of the inputs of the NAND gate 612 are high, when the first selection signal ANSELP for the counter multiplexer 126 is also high.

Figure 7:
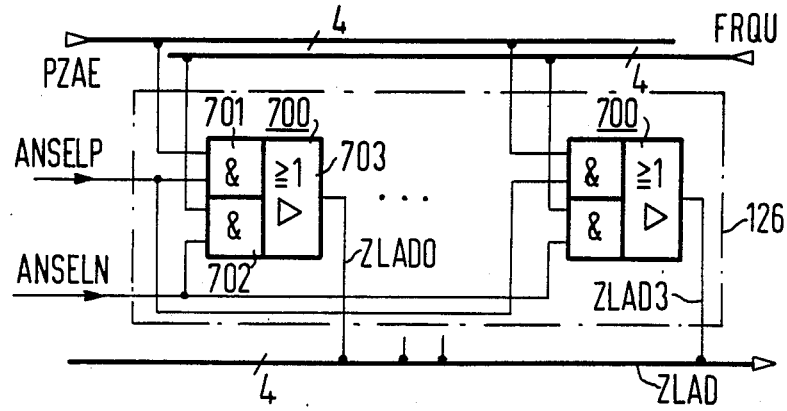
FIG. 7 is a schematic circuit diagram of the structure of the counter multiplexer for providing initial input values into the counter of the phase control circuit.

The counter multiplexer 126 is illustrated in FIG. 7. It is formed of four identical stages, with only the first and last being shown for clarity. Each stage has a pair of AND gates 701 and 702, which are connected to one line of the bus PZAE from the output of the PROM 126, or one line of the bus FRQU from the register 116, respectively. Each bus has four lines each.

Each stage 700 has a NOR gate 703 connected to receive the outputs of both AND gates 701 and 702. Each of the NOR gates 703 is also designed as a power stage, so that it can drive the bus ZLAD which is connected to load the counter 110. The second input of each AND gate 701 is connected to the selection signal ANSELP, and the second input of each AND gate 702 is connected to the inverse selection signal ANSELN. Thus, the individual four lines of one of the loading buses are selected for connection to the counter 110 over the bus ZLAD, under the control of the selection signals ANSELP and ANSELN.

FIG. 8 illustrates the counter 110, which incorporates a decoder 800 connected to receive the four lines of the bus ZLAD from the counter multiplexer 126 (FIG. 7). The decoder 800 has 15 outputs DEC01–DEC15, one of which goes high to indicate a decoded input value in the range of 1–15. As noted above, the counter 110 may be loaded with an initial value between 1 and 15, and the 15 outputs of the decoder 800 correspond to one of these loading values. A bus 801 connects the 15 outputs of the decoder 800 to the inputs of a loading network 802, which is connected over a further bus ZRP to the 16 register stages ZRO–ZR15 of the counter 110. For clarity, only four of the 16 register stages 803 are illustrated in FIG. 8. The 16 stages 803 are wired as a Johnson counter, with each data output Q of a less significant register stage being connected to the data input of the next register stage and the Q output of the most significant register stage being connected to the data input DS of the least significant register stage ZRO. The clock inputs of all stages are connected to the system clock. The stages are individually preset at loading inputs DP, which are connected to the lines of the bus ZRP, except for the highest register stages ZR15, the loading input DP of which is connected to the time control signal EXTD.

The parallel transfer of the signals supplied to the register stages of the counter 110 over the bus ZRP is controlled by the output of an OR gate 804 which is also fashioned as a power amplifier element. The inputs of the OR gate 804 are connected to the time control signal ZLTIM from the window generator (FIG. 6) and to the cycle signal ZS31 (from the status generator).

The control signals EXTD and ZLTIM both have a high level only at the end of the synchronization operating, as shown in FIG. 4. Thus, both signals have the purpose of synchronizing the counter 110.

As well known, without loading a preset value, a Johnson counter starts from zero and then increments to the state in which the lowest register stage contains a logical "1", progressively filling successive register stages with a logical "1", until every stage is set. For a 16 stage counter this requires 16 clock cycles. Thereafter, "0" level signals are continuously output from the Q output of the highest stage ZR15 to the data input DS of the lowest stage, so that all register stages are progressively reset from the lowest order stage to the more significant stages. At the highest counter reading, after 31 cycles, the logical "1" resides only in the highest register stage ZR15.

Correspondingly, stages 803 of the counter 110 are loaded with a count value which is higher by 16 than the value present on the bus PZAE (FIGS. 1 and 7), through the multiplexer 126 by the active time control signal ZLTIM if the further time control signal EXTD is high, as explained in more detail below. However, during the stationary operation of the phase control circuit, the time control signal EXTD is a low-level signal, and the counter 110 is loaded with the count values "0" through "15", through the loading network 802.

The loading network 802 is fashioned such that it logically combines the initial values on the lines DEC0-1–DEC15 from the decoder 800 to give the required values to load the Johnson counter. The register stage ZR14 of the Johnson counter may be set only when the loading value "15" is supposed to be loaded. Therefore, a loading signal ZRP14 is directly derived from the initial value DEC15 of the decoder 800 on the bus 801 which specifies this loading value. The next-lower register stage is to be set given the loading values "14" and "15". Therefore, the two initial values DEC15 and DEC14 may be logically combined with each other in the loading network 803, via an OR gate 805. The corresponding loading signal ZRP13 for the next-lower register stage ZR13 is derived in the same way. Although all of the stages of the loading network 802 are not illustrated in FIG. 8, it is apparent that the others are interconnected in the same manner so as to derive the signals required for loading the Johnson counter 110. This is true down to the lowest register stage which is set with a loading signal ZRP00 at each of the loading values "1" through "15", derived by the OR gate 805.

A plurality of exclusive OR gates 806 of the loading network 802 each supply the output signals ZRP00 through ZRP14. The time control signal EXTD is supplied, in parallel, to all of the exclusive OR gates 806. The second input of each exclusive OR gate is connected to the output of one of the OR gates 805, with the exception of the uppermost exclusive OR gate, to which the output value DEC15 is directly supplied.

The exclusive OR combination of the output signals of the OR gates 805, with the time control signal EXTD, means that a non-inverted state at the output of a corresponding OR gate 805 is only connected to the bus line ZRP when the time control signal EXTD has a low level. This is the normal condition in the stationary operation of the phase control circuit. At the end of the synchronizating operation, however, the time control signal EXTD is at a high level for the length of one bit cell (Fig. 4(k)) and thus inverts all outputs of the loading network 802. In this way the desired function is achieved, namely, that the value from the PROM 124 read out from the address 0 and transmitted over the loading bus PZAE is increased by the value 16 and loaded when the control signal ZLTIM arrives. This achieves the purpose of setting the phase relation to a mean value, for example, 16+3=19, at the time of the fifth appearance of the delayed marker pulse MI-D.

The Q outputs of the stages 803 of the counter 110 are connected to lines of a bus ZAEST which manifests the current state of the counter 110. This is supplied to the status generator 203 of the control logic unit, which is shown in detail in FIG. 9.

The function of the status generator (FIG. 9) is to generate cycle signals at specific times synchronized with the system clock CLOCK, these cycle signals reflecting the current state of the counter. In general, the synchronizing with the system clock is achieved by a group of D flip-flops 900–903. The cycle signal ZS16, which has a high level during the counter state "16" is produced by the $\bar{Q}$ output of the flip-flop 900. This is the case when a signal having a low level is supplied to the D input of the flip-flop 900 at the time of the triggering edge of the system clock, which is applied to the clock inputs of the flip-flops 900–903. This signal is derived from a combination of signals on the bus ZAEST, which carries counter position signals ZAE00 through ZAE15 during the preceding counter status "15". In this state of the counter 110, the counter position signal ZAE15 still has a low level, whereas the less significant counter position signal ZAE14 is already high. The higher counter position signal ZAE15 is inverted by an inverter 904 and connected to one input of a NAND gate 905, the other input of which is connected directly to the signal ZAE14. The output of the NAND gate 905 is connected to the D input of the flip-flop 900, to supply the low level at the appropriate time.

The second D-type flip-flop 901 of the status generator generates mutually inverse signals ZS31N and ZS31P for the counter reading "31". The counter position signals ZAE14 and ZAE13 which are significant in determining this counter state, exhibit high and low levels, respectively, for the preceding counter state "30". They are combined with the assistance of an inverter 906 and a NAND gate 907. One input of the NAND gate 907 is connected directed to the ZAE14 signal, and the other input is connected to the ZAE13 signal through the inverter 906. The output of the NAND gate 907 is connected to one input of an AND gate 908, the other input of which is connected to receive the reset signal RESET from the device control unit 105 (FIG. 1). The output of the AND gate 908 is connected to the D input of the flip-flop 901. The cycle signals ZS31N and ZS21P, which specify the counter state of "31", are thus output when the general reset signal occurs, so that the entire network is given a defined initial condition.

The same position signals ZAE14 and ZAE13 are combined in a further inverter 909 and NAND gates 911 and 910 to furnish signals to the D inputs of the flip-flops 902 and 903, respectively. The output of the NAND gate 910, which is connected to the D input of the flip-flop 903 is low during counter status "14" of the counter 110, so that the flip-flop 903 produces the signal ZS15N and ZS15P only during the counter status "15". The NAND gate 911 is connected to supply a signal to the D input of the flip-flop 902. The flip-flop 902 produces the signal ZLSP from its Q output which indicates the status "load counter" following the counter status "31".

The status generator 203 also incorporates an AND gate 913 connected to receive the position signal ZAE04 directly, and the signal ZAE03 through an inverter 912, to produce an output signal ZST20 which is high when the counter has just assumed the state "20".

Figure 9:
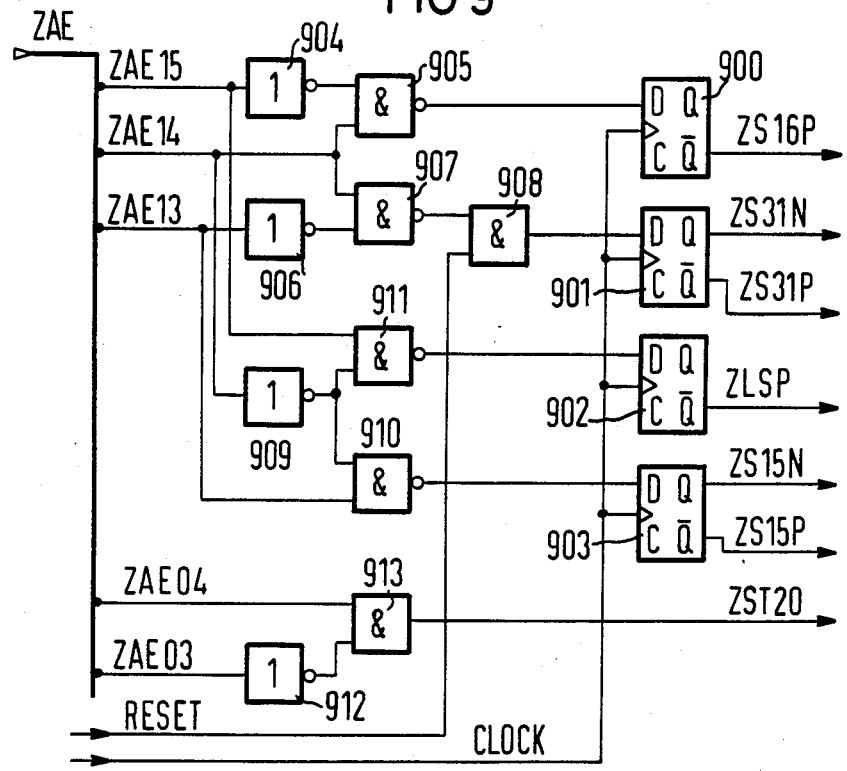
FIG. 9 is a circuit diagram of a status generator of the control logic unit.

The output signals of the status generator of FIG. 9 identify the various states of the counter 110 which are significant for the phase control circuit, and furnish time control signals for the remaining components of the phase control circuit. The function and significance of many of these signals have been explained above in connected with the components of FIGS. 1 and 2.

Figure 10:
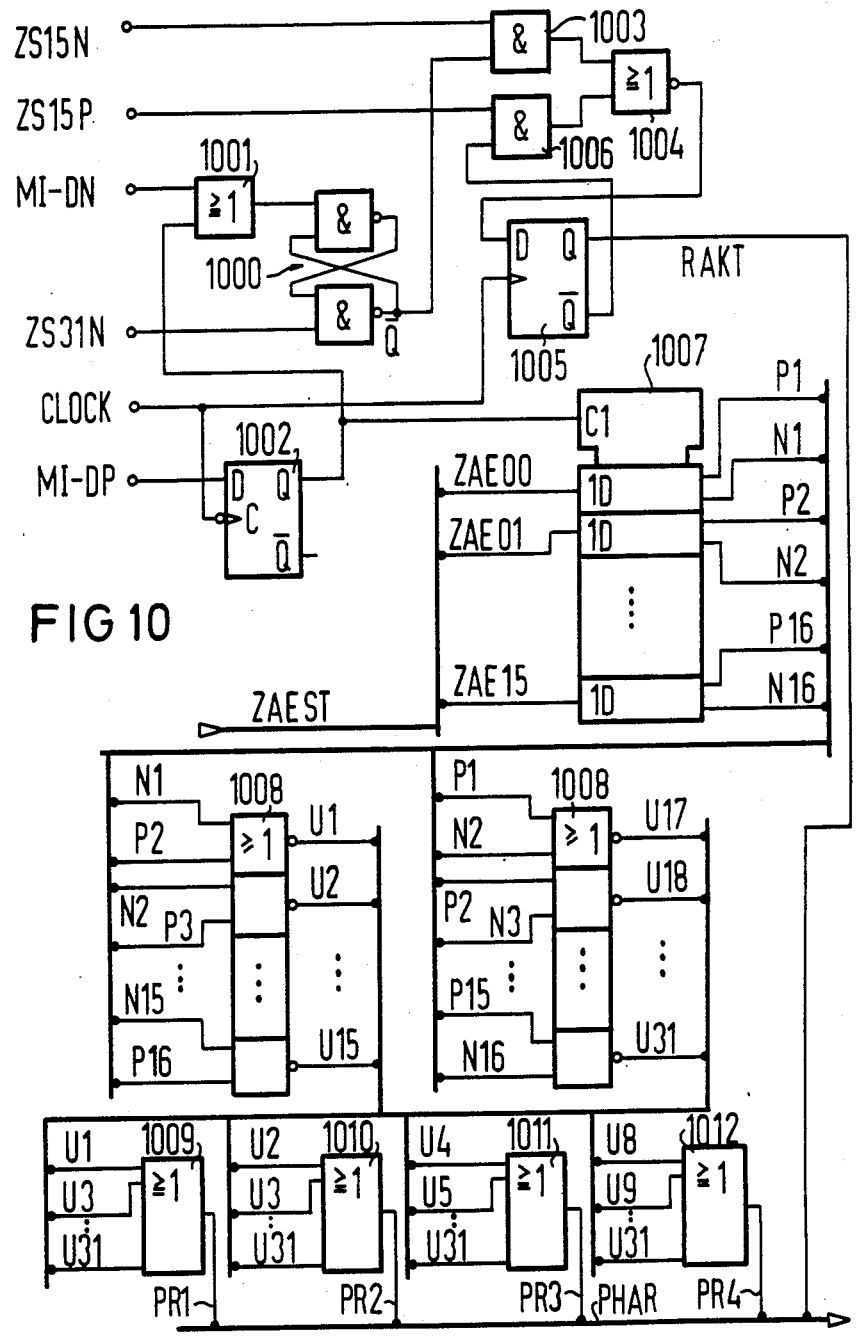
FIG. 10 is a schematic circuit diagram of a storage register of the phase control circuit, which is connected to the counter.

As already described, the storage register 112 accepts the current state of the counter 110 when a delayed marker pulse MI-D has been produced before the counter 110 reaches the counter state "16". FIG. 10 is a circuit diagram of the storage register 112 and illustrates its construction.

FIG. 10 includes a logical network for generating the control signal RAKT which identifies the active condition of the storage register 112. This network incorporates an RS-flip-flop 1000 which is reset with the signal ZS31N from the status generator 203 (FIG. 9). In the foregoing, it has been assumed that the delayed marker pulse MI-D output by the shift register 114 is a signal having a high level in the active condition. In fact, the shift register 114 also produces an inverse output signal and both the positive and inverse signals MI-DP and MI-DN are supplied to the apparatus of FIG. 10 in the active condition. The delayed marker pulse MI-DN (the low level active signal) is supplied to the set input of the RS-flip-flop 1000 through an OR gate 1001. The delayed marker pulse MI-DP (active high) is captured with the system clock using a D-type flip-flop 1002 driven with the trailing edge of the system clock. The Q output of this flip-flop is connected to a second input of the OR gate 1001. In this way, the flip-flop 1000 is set at the appearance of a delayed marker pulse MI-D, and is held in a set condition until it is reset by the cycle signal ZS31N.

The $\overline{Q}$ output of the RS-flip-flop 1000 is connected to an input of an AND gate 1003, the other input of which is connected to receive the cycle signal ZS15P. The output of the AND gate 1003 is connected through a NOR gate 1004 to the data input of a further D-type flip-flop 1005, having its clock input connected to the system clock. When the cycle signal ZS15P, which identifies the counter state "15" appears before the RS-flip-flop 1000 has been set, the AND gate 1003 produces a high output and the NOR gate 1004 places a logical "0" at the D input of the flip-flop 1005, which brings RAKT low coincident with the next system clock. The low level of the control signal RAKT identifies the inactive condition of the storage register 112. To hold the signal low, the $\overline{Q}$ output of the D flip-flop 1005 is connected to an input of the NOR gate 1004 through an AND gate 1006, the other input of which is connected to receive the signal ZS15P. When the delayed marker pulse MI-D occurs no later than together with the cycle signal ZS15P, the flip-flop 1005 then stores the logical "1" and the control signal RAKT assumes a high level.

The D-type flip-flop 1002 functions as an intermediate storage for the delayed marker pulse MI-DP, and the output of the flip-flop 1002 is supplied as a transfer clock for the 16 state register 1007. The register 1007 is made up of D-type flip-flops in an entirely conventional way and is therefore only shown schematically in FIG. 10. Each of the counter position signals ZAE0 through ZAE15 is supplied to the loading inputs of this register and the status of the counter 110 is thus copied into the register 1107 as soon as a delayed marker pulse MI-D has appeared.

As noted above, the counter 110 is a Johnson counter. On the other hand, the counter status transmitted to the address inputs of the PROM 124 is in the form of a binary value. For this reason, the content of the register 1007 must be recoded into binary form.

The inverse of the operation set forth above in connection with the decoding the binary loading value for the counter 110 occurs here. The significant bit sequence "1", "0" exists in the Johnson counter for any counter state at only one adjacent pair of outputs. Thus, for example, with the counter state of "1", the position signals ZAE00 and ZAE01 are set and reset, respectively. The opposite condition occurs for the counter state "17".

The state of the register 1007 can be reconverted from Johnson counter format into one of a plurality of decoded output lines by examining the state of adjacent stages of the register 1007. To this end, two strings of NOR gates 1008 are provided, each gate having one input connected to the true output of one stage of the register 1007, and the other connected to the inverse output of the an adjacent stage. For example, the top NOR gate 1008 of the left hand string is connected to the inverse output of stage 1 of the register 1007 and to the true output of stage 2 of the register. These lines are both high only when the register 1007 stores the state "1", and in that event the top NOR gate 1008 produces a low signal U1. The next to the top NOR gate 1008 in the left hand string is connected to the inverse output from the second stage of the register 1007 and to the true output of the third stage. It produces a low signal only when the register 1007 stores the state "2". Similarly, the last NOR gate in the left hand string is connected to the inverse output of the 15th stage and the true output of the 16th stage, and produces an output when the register 1007 stores the state "15".

In similar fashion, the NOR gates of the right hand string shown in FIG. 10 are also connected to true and inverted outputs of adjacent stages. The topmost NOR gate is connected to the true output of the first stage, and to the inverse output of the second stage, and produces a low going output U17 only when the register 1007 stores the state "17".

FIG. 10 illustrates a heavy solid line connecting the 32 respective outputs of the register 1007 with corresponding inputs of the NOR gates 1008 to indicate plural lines making these connections. In similar fashion, the outputs U1-U31 of these gates are indicated by a heavy solid line showing a bus for these signals.

The signals U1-U31 are connected as inputs to four OR gates 1009-1012, connected as a binary coding network, in the sequence illustrated in FIG. 10, to allow the formation of a binary quantity at the outputs of the OR gates on the lines PR1–PR4. These lines are connected via the bus PHAR to the input of the multiplexer 122 (FIG. 1), and to the input of the logic control unit 118, along with the control signal RAKT, described above. Although the 32 states indicated in the register 1007 could be coded into a five digit binary number, the four digit binary number produced by the OR gates 1009–1012 is adequate since only the counter states "0" through "15" are employed for addressing the PROM 124.

Figure 11:
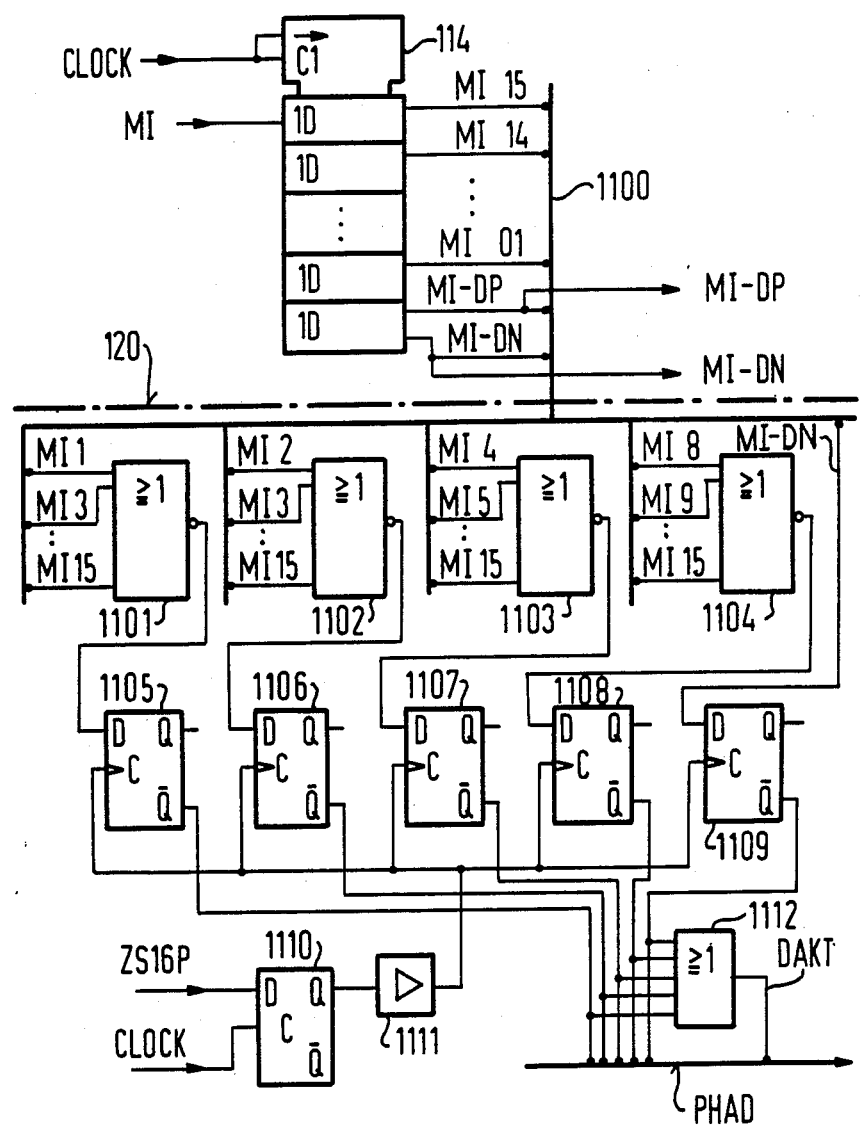
FIG. 11 is a circuit diagram of a shift register and intermediate storage register of the phase control circuit.

The intermediate storage register 120 is constructed in the same manner as the storage register 112 illustrated in FIG. 10. FIG. 11 illustrates the details of the storage register 120, in association with the shift register 114. The shift register 114 is a conventional 16 bit register which employs the system clock as a source of clock pulses in order to shift the marker pulses MI supplied to the first stage of the register. The construction of the shift register 114 is entirely conventional, and is therefore shown only schematically in FIG. 11.

All of the parallel outputs from the stages of the shift register are connected over a shift register bus 1100 to the inputs of the intermediate storage register 120. Only the true output from each stage is connected to the bus 1100, except for the most significant stage, for which the true and inverse outputs are both connected to the bus 1100.

The intermediate storage register 120 contains a decoder network which is constructed of NOR gates 1101–1104, shown schematically in FIG. 11. This decoder network is constructed in accordance with the arrangement described in connection with FIG. 10 for the storage register 112, comprising the OR gates 1009–1012 described above. Thus, the least significant NOR gate 1101 of the intermediate storage register 120 generates the least significant bit for the binary coded position value of the marker pulse MI in the shift register 114. The most significant bit of this binary value is directly formed from the delayed marker pulse MI-DN. The five bit binary value for the position of the delayed marker pulse MI-D is stored in traditional fashion in five D-type flip-flops 1105–1109 which make up the intermediate storage register 120. The transfer clock for these storage flip-flops 1105–1109 is derived from the cycle signal ZS16P which is supplied to the D input of a further D-type flip-flop 1110. Its clock input is connected to the system clock. The Q output of the flip-flop 1110 is amplified with an amplifier 1111 and then supplied to the clock inputs of the flip-flops 1105–1109. In this fashion, the current position of the delayed marker pulse MI-D in the shift register 114, is intermediately stored in the register 120 at the time that the state of the counter 110 reaches "16".

The inverse outputs of the storage flip-flops 1105–1109 are all connected to inputs of an OR gate 1112 in order to form the control signal DAKT at the output of the gate 1112. This signal indicates the active status of the intermediate storage register 120.

As shown in FIG. 1, both output buses PHAR and PHAD of the counter register 112 and the intermediate storage register 120 are connected through the phase multiplexer 122 to one group the address inputs of the PROM 124. The structure of the phase multiplexer is conventional and is identical to that of the counter multiplexer 127 shown in FIG. 7, so that it need not be described in detail.

Figure 12:
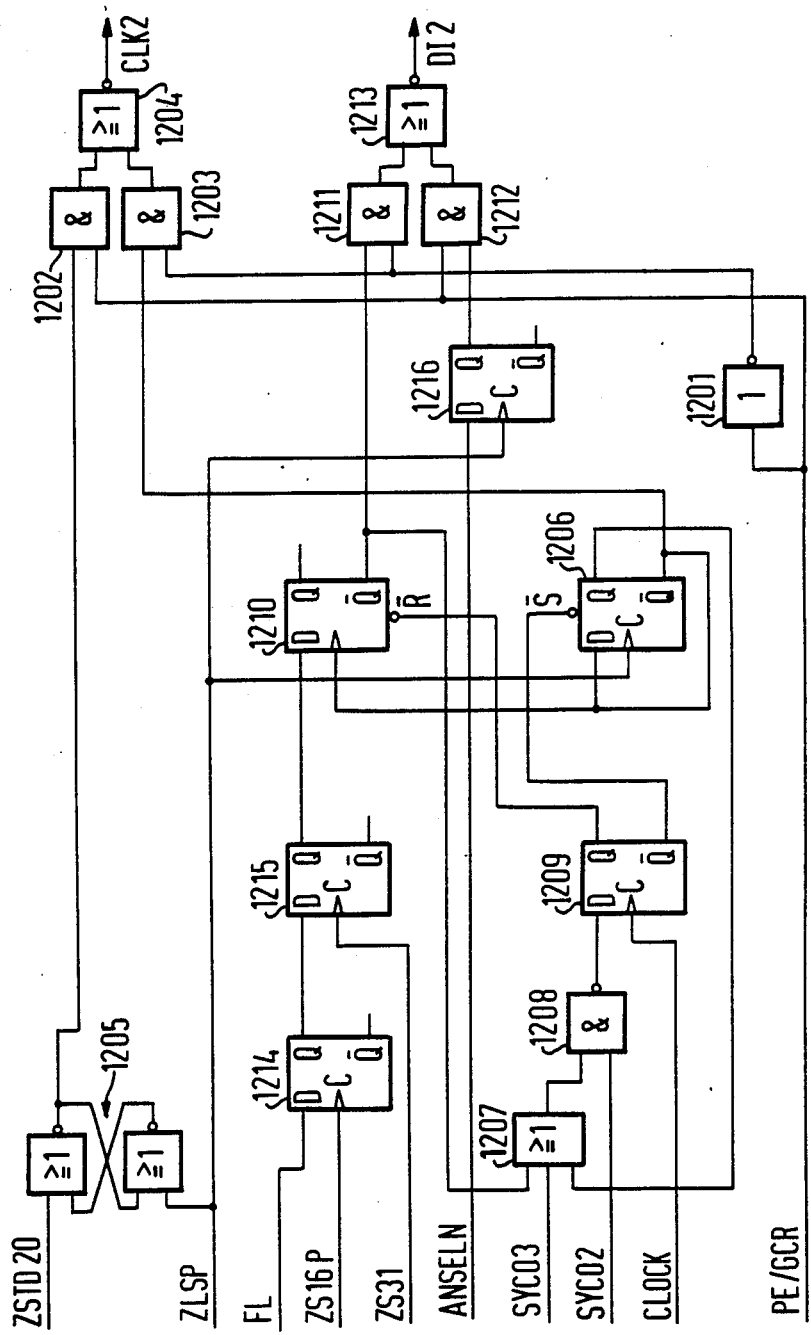
FIG. 12 is a schematic circuit diagram of the data output network of the control logic unit, for generating the reacquired data signals and clock signals.

All functions of the control logic unit 118 of the phase control circuit have been described above insofar as they relate to the correction of the rated values in the phase control circuit itself. FIG. 12 shows a circuit diagram of the data output network 104 of the control logic unit 118 which generates the data clock CLK2, which is the reacquired clock signal derived by operation of the phase control circuit. The output network 204 of FIG. 12 also produces the derived data signals DI2 derived through the use of the phase control circuit.

Depending on the recording method employed with the magnetic medium, the generation of the reacquired data clock CLK2 is controlled by the selection signal PE/GCR. To this end, this signal is supplied directly to an input of an AND gate 1202, and through an inverter 1201 to an input of an AND gate 1203. The outputs of the AND gates 1202 and 1203 are connected through a NOR gate 1204 to supply the signal CLK2.

The second input of the AND gate 1202 is connected to the output of an RS-flip-flop 1205 which is reset with the cycle signal ZSLP at the time of the status "load counter", and set with the cycle signal ZSTD20 for the counter status "20". In the steady state of the digital phase control circuit, the cycle signal ZSTD20 defines the center of a counting cycle of the counter 110. In the mode of operation of the magnetic storage device in which the edge of the derived data signal DI2 is always normally generated between two counter cycles (the PE method), then the clock edge of the reacquired data clock CLK2 must coincide therewith or the clock edge must be shifted by half a counting signal in the GCR method.

When the GCR method is employed, the selection signal PE/GCR is high and the AND gate 1202 gates it with the output of the RS-flip-flop 1205 so that the NOR gate 1204 outputs a negative going clock pulse.

When the PE method is being used, the cycle signal ZLSP is used for supplying a trigger signal to a D-type flip-flop 1206, which has its $\overline{Q}$ output connected back to its data input and also to the second input of the AND gate 1203. In the reset condition, the flip-flop 1206 produces a high output signal at the time the cycle signal ZLSP appears and this high level signal is transmitted by the AND gate 1203 to form the signal CLK2.

The flip-flop 1206 has a set/reset network formed of an OR gate 1207, a NAND gate 1208 and a further D-type flip-flop 1209. The OR gate 1207 has three inputs which are connected respectively to the $\overline{Q}$ output of a further D-type flip-flop 1210, to the time signal SYC03, and to the Q output of the flip-flop 1206. The flip-flop 1210 is reset at the time of the negative going edge of the edge signal FL, and at that time furnishes a high level at its $\overline{Q}$ output which is passed through the OR gate 1207.

The second input to the OR gate 1207, the SYC03 signal, is low during the synchronizing operation as shown in FIG. 4(j), and assumes a high level as soon as the digital phase control circuit has been synchronized. In this condition, the OR gate 1207 supplies a high level output to enable the NAND gate 1208.

The second input of the NAND gate 1208 is connected to the second synchronization signal SYC02. During the synchronization operation, this signal identifies the beginning of the counter mode, as described in connection with FIG. 3. In the synchronized position of the digital phase control circuit, the NAND gate 1208 always has a low output, which supplies a low level to the data input of a flip-flop 1209, holding it in reset condition. The $\overline{Q}$ output of this flip-flop is connected to the set input of the flip-flop 1206, so that it can become effective only during the synchronizing operation. Inversely, the Q output of the flip-flop 1209 is connected to a reset input of the flip-flop 1210, so that it is indirectly activated by the system clock in the synchronized condition of the phase control circuit.

The NAND gate 1208 is only active once, at the beginning of the counter mode, during the synchronizing operation, because of the SCY02 input. Thus, the flip-flop 1206 is set in a defined fashion by the flip-flop 1209 and switches its state when triggered by the cycle signal ZLSP once during each counter cycle. This yields the reacquired data clock CLK2 at the output of the NOR gate 1204 which is desired for the PE writing method.

The derived data signal DI2 is generated by a NOR gate 1213 connected to outputs of two AND gates 1211 and 1212. Each one of these AND gates is selected when employing a respective one of the two recording methods PE, or GCR. The AND gate 1211 is connected to the output of a chain of series connected flip-flops 1214, 1215 and 1210. The flip-flop 1214 is triggered by the cycle signal ZS16, and has the edge signal FL supplied to it as the data input, which identifies the direction of the most recent edge change in the data signal DI. The cycle signal ZS31 is connected to the clock input of the flip-flop 1215, so that it assumes the state of the preceding flip-flop 1214 at the end of a counter cycle. Finally, this stored value is loaded into the flip-flop 1210 at the time of switching of the flip-flop 1206. The $\overline{Q}$ output of the flip-flop 1210 is connected as the second input to the AND gate 1211 so that, for the GCR method, the edge of the data signal appears at the time, at the output of the data output stage, as an edge of the derived data signal DI2.

The AND gate 1212 has an input connected to the Q output of a flip-flop 1216 which is triggered with the cycle signal ZLSP, and which has the signal ANSELN, which is the selection signal for the counter multiplexer 126, applied as the data input. As described in connection with the window generator 202, this signal appears together with the cycle signal ZSTD20, allowing the output signal DI2 to be generated at the correct time.

It will be apparent from the foregoing that the present invention furnishes an efficient mechanism for following any variation in pulse repetition rate of the signals being transmitted from a transmitting device such as a magnetic tape storage device, and is able to quickly accommodate any changes in the operating frequency without loss of data. It will be apparent that various modifications and additions to the apparatus described above may be made by others skilled in the art, without departing from the essential features of novelty of the present invention, which are intended to be defined and secured by the appended claims.

What is claimed is:

1. In a circuit arrangement for the reacquiring of data signals and data clock signals from a self clocking transmission, including a digital phase control circuit, an internal clock for said digital phase control circuit, and means for supplying to said digital phase control circuit marker pulses identifying the time of arrival of data signal edges and edge signals indentifying the direction of the data signal edge which has occurred most recently, said digital phase control circuit comprising, in combination, a presettable counter functioning as a controllable oscillator, means responsive to said internal clock for loading said counter with an initial value corresponding to the frequency of the current data clock to define an updated time base of the phase control circuit, a shift register, means for applying said marker pulses to said shift register, means for shifting said marker pulses through said shift register under control of said internal clock, means causing said counter to count cycles of said internal clock in synchronism with operation of said shift register, a counter storage register connected to said counter, an intermediate storage register connected to said shift register, said counter storage register being operative to store the current state of said counter as a leading phase value, said intermediate storage register being operative to store the position of the marker pulses within said shift register as a trailing phase value, said counter storage register and said intermediate storage register being alternately operable in accordance with whether the appearance of said marker pulse at the serial output of said shift register occurs before or after a predefined counter reading, and rated value generator means connected to said storage register and to said intermediate storage register for generating a new initial value in response to one of said phase values, and means for presetting said counter with said new initial value.

2. Apparatus according to claim 1, including a multiplexer having a first input connected to an output of said counter storage register and a second input connected to an output of said intermediate storage register and having an output connected to an input of said rated value generator means, said multiplexer being operable to selectively supply the state of said counter register or the state of said intermediate storage register to said rated value generator means in response to a multiplexer control signal indicative of the operative condition of one of said registers.

3. Apparatus according to claim 2, including a frequency register connected to the output of said rated value generator means for storing signals corresponding to the current frequency of said data clock signals, and means connecting an output of said frequency register to an input of said rated value generator means, whereby said rated value generator means produces a new initial value in response to the content of said frequency register and in response to a phase value represented by the signals supplied by said multiplexer.

4. Apparatus according to claim 3, including a second multiplexer, said second multiplexer having a first input connected to an output of said rated value generator means and a second input connected to said frequency register, and having an output connected to said counter, said second multiplexer being adapted to selectively connect one of its inputs to said counter for presetting said counter in response to the time of occurrence of a marker pulse, if said marker pulse occurs during the counting cycle of said counter, and to connect its other input to said counter if no marker pulse occurs during said counting cycle.

5. Apparatus according to claim 1, wherein said rated value generator means comprises a memory a first multiplexer, a frequency register, signals corresponding to the phase value selected by said first multiplexer being supplied to first address inputs of said memory and signals corresponding to the content of said frequency register being supplied to second address inputs of said memory, whereby a memory location is selected in which a new initial value is stored corresponding to the signals supplied to said address inputs, and including means for supplying from said memory a new value to said frequency register or a new initial value to said counter.

6. Apparatus according to any of claims 1-5, including a control logic unit for supplying timing signals for controlling the timing of operations of said phase control circuit, said control logic unit comprising a status generator connected to said counter for generating cycle signals corresponding to the current state of said counter, and a data output network connected to receive said cycle signals and responsive thereto for generating reacquired data signals and reacquired data clock signals.

7. Apparatus according to claim 6, wherein said counter comprises a plurality of series connected register stages, each of said register stages having an output for identifying the state of such stage, and means for connecting a plurality of said stages to said status generator, said status generator comprising a logic network connected to receive inputs from a plurality of said register stages, and a trigger circuit connected to said logic network and to said internal clock for producing cycle signals identifying predetermined states of said counter.

8. Apparatus according to claim 7, wherein said control logic unit includes window generator means comprising a logic circuit connected to receive a marker pulse during a counting cycle of said counter, and a trigger circuit connected to said logic circuit and to one of said cycle signals for generating a selection signal for the control of said multiplexer.

9. Apparatus according to claim 8, wherein said window generator means comprises a further trigger circuit connected to receive said internal clock and a control signal synchronized with the loading of said counter, a flip-flop connected to said further trigger circuit, and a logic element connected to an output of said flip-flop and responsive thereto for gating said selection signal to initiate loading of said frequency register.

10. Apparatus according to claim 6, wherein said data output network comprises an output stage formed of a plurality of AND gates a magnetic storage device and an OR gate connected to said AND gates, one of said AND gates being selectively enabled by a selection signal identifying the mode of operation of said magnetic storage device, one of said AND gates being connected to the output of a flip-flop which is set by a first cycle signal identifying the bit cell center and which is reset by a second cycle signal appearing during the loading operation of said counter, and the other said AND gates being connected to a flip-flop which is triggered by a cycle signal subsequent to said second cycle signal.

11. Apparatus according to claim 10, including a further output stage constructed of a plurality of AND gates and a further OR gate connected to said further AND gates, each of said AND gates being connected to receive a signal from an individual output flip-flop, one of said output flip-flops being operated in response to a cycle signal and to an edge signal, and the other output flip-flop being operated in response to said cycle signal and said selection signal supplied to said second multiplexer.

12. Apparatus according to claim 6, wherein said control logic also comprises a synchronizing network for initiating operation of said phase control circuit after an interruption in said marker pulses, means for supplying said synchronizing network with said marker pulses and an external synchronizing signal and with said internal clock signal, whereby said synchronizing network generates a selection signal, said frequency register being constructed as a binary counter connected to said internal clock for counting clock cycles in response to said selection signal, and means for resetting said counter after reception of a predetermined plurality of marker pulses, wherein the state of said counter, corresponds to the average pulse repetition rate of said marker pulses.

13. Apparatus according to claim 12, wherein said synchronizing network includes an evaluation stage connected to receive said synchronizing signal and to provide an evaluated synchronizing signal which is synchronized with said internal clock, means for supplying said evaluated signal as a reset signal to said frequency register, and including a flip-flop connected to said reset signal for manifesting a signal which identifies the performance of a sychronizing operation and which inhibits loading or read-out of said register during such synchronizing.

14. Apparatus according to claim 12, wherein said synchronization network comprises an initial flip-flop connected to receive said synchronizing signal, an AND gate having one input connected to said initial flip-flop and another input connected to receive said marker pulses, a plurality of further flip-flops connected in series, the clock inputs of all of said further flip-flops being connected to the output of said AND gate, means for connecting the data input of the first of said further flip-flops to the output of said initial flip-flop, an OR gate having one output connected to said initial flip-flop and a second input connected to the output of the penultimate one of said series-connected flip-flop of said further flip-flops for producing a second derived synchronizing signal, and an end flip-flop connected to receive said second synchronizing signal and said reset signal for producing a control signal identifying the end of the synchronizing operation, and means connected to the last said serial connected flip-flops for resetting said first flip-flop and for identifying a change in the mode of operation of said counter.

15. Apparatus according to any of claims 1-5, wherein the frequency of said internal clock is set so that the normal bit cell of the data signals transmitted from said magnetic storage device has a nominal period corresponding to 24 periods of said interval clock, said counter being formed as a 16-stage counter, means for loading said counter with initial values between 0 and 15, said frequency register being constructed as a binary counter, and a decoder having its input connected to said frequency register for converting the binary value supplied by said register into one of 15 decoder output signals representative of a counter reading, and a loading network for said counter, said loading network being connected to said decoder for converting the decoder signals into loading signals for individually setting the individual stages of said counter.

16. Apparatus according to any of claims 1-5, wherein said counter storage register comprises a decoder network having a plurality of OR gates for converting signals identifying a counter state into a binary value corresponding to the current counter reading.

17. Apparatus according to any of claims 1-5, wherein said shift register is a 16-stage shift register, and said intermediate storage register is connected in parallel with the stages of said shift register and includes a loading network composed of a plurality of AND gates for coding the current position of a marker pulse in said shift register into a binary value, and including a plurality of flip-flops for storing and manifesting said binary value.

18. Apparatus according to claim 17, including means connected to said marker pulses for supplying an operation signal to said intermediate storage register, a logic network connected to the output of said 16-stage register and having outputs connected to said plurality of flip-flops forming said intermediate storage register, and means for loading said intermediate storage register with signals produced by said logic circuit, in response to a signal indicating a predetermined state of said counter.

19. A method of reacquiring data signals and data clock signals from a self-clocking stream of transmitted data information, wherein a sequence of marker pulses is retrieved from said stream of data information continuously to determine the current data period of said stream of data information, comprising the steps of;

generating an internal clock pulse signal for supplying clock pulses to a shift register and to a counter set to a preselected initial value at the beginning of an operation cycle corresponding to a data period, shifting said marker pulse of said data period through said shaft register at the rate of said internal clock pulse signal, storing the current state of said counter at the time when said marker pulse is produced as an output at the last stage of said shift register and storing the current position of said marker pulse within said shift register at the time when said counter reaches a predetermined counter state prior to said marker pulse being produced as an output of said shift register, and selecting a new initial value for a subsequent cycle of operation in dependence on the stored state of said counter and the stored position of said marker pulse.

20. The method of claim 19, including the steps of using a ROM to store predetermined initial values for said counter and addressing said ROM with an address which includes the said state or position stored during a preceding cycle of operation.

21. The method of claim 19, including the step of selectively presetting said counter to an initial value corresponding to the curent frequency of said marker pulses.

* * * * *